(12) United States Patent
Albrecht et al.

(10) Patent No.: US 11,613,816 B2
(45) Date of Patent: Mar. 28, 2023

(54) SYSTEMS AND METHODS TO MAKE HYDROGEN GAS USING METAL OXYANIONS OR NON-METAL OXYANIONS

(71) Applicant: Verdagy, Inc., Moss Landing, CA (US)

(72) Inventors: Thomas Albrecht, Santa Clara, CA (US); Kyle Self, San Jose, CA (US); Ryan J. Gilliam, Moss Landing, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

(21) Appl. No.: 17/659,233

(22) Filed: Apr. 14, 2022

(65) Prior Publication Data
US 2022/0275521 A1    Sep. 1, 2022

Related U.S. Application Data

(63) Continuation of application No. 17/653,041, filed on Mar. 1, 2022.
(Continued)

(51) Int. Cl.
*C25B 1/04* (2021.01)
*C25B 1/50* (2021.01)
(Continued)

(52) U.S. Cl.
CPC .............. *C25B 1/04* (2013.01); *C25B 1/50* (2021.01); *C25B 9/00* (2013.01); *C25B 15/081* (2021.01); *C25B 15/087* (2021.01)

(58) Field of Classification Search
CPC .................................... C25B 1/04; C25B 1/50
See application file for complete search history.

(56) References Cited

U.S. PATENT DOCUMENTS

| 2,843,537 A | 7/1958 | Carus |
| 2,908,620 A | 10/1959 | Carus |

(Continued)

FOREIGN PATENT DOCUMENTS

| CN | 109208022 A | * | 1/2019 |
| JP | 2014502676 A | * | 2/2014 |

(Continued)

OTHER PUBLICATIONS

"International Application Serial No. PCT/US2022/070891, International Search Report dated May 13, 2022", 3 pgs.

(Continued)

*Primary Examiner* — Salil Jain
(74) *Attorney, Agent, or Firm* — Schwegman Lundberg & Woessner, P.A.

(57) ABSTRACT

Disclosed herein are methods and systems that relate to oxidizing a metal ion of a metal oxyanion or a non-metal ion of a non-metal oxyanion from a lower oxidation state to a higher oxidation state at an anode and generate hydrogen gas at the cathode. The metal oxyanion with the metal ion in the higher oxidation state or the non-metal oxyanion with the non-metal ion in the higher oxidation state may be then subjected to a thermal reaction or a second electrochemical reaction, to form oxygen gas as well as to regenerate the metal oxyanion with the metal ion in the lower oxidation state or the non-metal oxyanion with the non-metal ion in the lower oxidation state, respectively.

30 Claims, 9 Drawing Sheets

Related U.S. Application Data

(60) Provisional application No. 63/249,126, filed on Sep. 28, 2021, provisional application No. 63/155,167, filed on Mar. 1, 2021.

(51) Int. Cl.
  *C25B 15/08*    (2006.01)
  *C25B 9/00*    (2021.01)

(56) References Cited

U.S. PATENT DOCUMENTS

| | | |
|---|---|---|
| 3,062,734 A | 11/1962 | Carus |
| 3,652,351 A | 3/1972 | Guisti |
| 5,660,712 A | 8/1997 | Carus, III et al. |
| 2012/0237440 A1 | 9/2012 | Kodama et al. |
| 2017/0306510 A1 | 10/2017 | Rothschild et al. |
| 2022/0325422 A1 | 10/2022 | Albrecht et al. |

FOREIGN PATENT DOCUMENTS

| | | |
|---|---|---|
| WO | WO-2006113463 A2 | 10/2006 |
| WO | 2022187810 | 9/2022 |

OTHER PUBLICATIONS

"International Application Serial No. PCT/US2022/070891, Written Opinion dated May 13, 2022", 6 pgs.

U.S. Appl. No. 17/653,041, filed Mar. 1, 2022, Systems and Methods to Make Hydrogen Gas Using Metal Oxyanions or Non-Metal Oxyanions.

Anantharaj, Sengeni, et al., "Membrane free water electrolysis under 1.23 V with T $Ni_3Se_4$/Ni anode in alkali and Pt cathode in acid", Applied Surface Science 478, (2019), pp. 184-192.

Issa, I. M., et al., "The Stability of Potassium Permanganate in Alkaline Solutions Containing Telluric Acid", Journal of the American Chemical Society 77.21, (1955), pp. 5503-5504.

Lin, Kaixiang, et al., "Alkaline quinone flow battery", Science 349.6255, (2015), pp. 1529-1532.

Teschke, O., et al., "Operation of a steady-state pH-differential water electrolysis cell", International Journal of Hydrogen Energy 7.12, (1982), pp. 933-937.

Teschke, O., "Theory and operation of a steady-state pH differential water electrolysis cell", Journal of Applied Electrochemistry 12.2, (1982), pp. 219-223.

Veprek-Šiška, J., et al., "The mechanism of the decomposition of alkaline permanganate solutions", Journal of Inorganic and Nuclear Chemistry 31.3, (1969), pp. 789-798.

\* cited by examiner

SYSTEMS AND METHODS TO MAKE HYDROGEN GAS USING METAL OXYANIONS OR NON-METAL OXYANIONS

CROSS-REFERENCE TO RELATED APPLICATION

This application claims the benefit of priority to U.S. Patent Application Ser. No. 17/653,041. tiled Mar. 1, 2022, which claims the benefit of priority to U.S. Provisional Patent Application Ser. No. 63/155,167, filed Mar. 1, 2021, and to U.S. Provisional Application Ser. No. 63/249,126, filed Sep. 28, 2021, the disclosures of which are incorporated by reference herein in their entireties.

BACKGROUND

As electricity production migrates to lower $CO_2$ footprint technologies, the ability to convert electricity into low-carbon/zero-carbon transportation fuels has become an increasingly important challenge in mitigating global $CO_2$ emissions. Among the options for such fuels, hydrogen ($H_2$) may have a unique advantage in that its oxidation product is water. Thus, hydrogen represents a low-carbon transportation fuel if it can be manufactured with a low-carbon footprint.

Hydrogen may be generated as a co-product in a number of industrially important processes such as steam cracking and the chlor-alkali process. On-purpose hydrogen production may be typically accomplished via a process known as steam-methane reforming (SMR), which converts the hydrogen atoms in both methane and water to hydrogen gas. Although this process can produce large amounts of hydrogen, the carbon atoms that were initially present in the methane ultimately leave the process as $CO_2$ emissions. Any effort to use hydrogen as a zero-carbon or low carbon transportation fuel would require another process.

SUMMARY

There are provided methods and systems herein that relate to the production of hydrogen gas and other commercially valuable products.

The present disclosure describes a method to generate hydrogen gas, the method comprising:
providing an anode and an anode electrolyte in an electrochemical cell wherein the anode electrolyte comprises a metal oxyanion with a metal ion in a lower oxidation state or the anode electrolyte comprises a non-metal oxyanion with a non-metal ion in a lower oxidation state;
oxidizing the metal oxyanion with the metal ion in the lower oxidation state to a metal oxyanion with metal ion in a higher oxidation state or oxidizing the non-metal oxyanion with the non-metal ion in the lower oxidation state to a non-metal oxyanion with non-metal ion in a higher oxidation state at the anode; and
providing a cathode and a cathode electrolyte in the electrochemical cell and forming hydrogen gas and hydroxide ions at the cathode.

In some examples, the method further comprises separating the anode electrolyte from the cathode electrolyte by an anion exchange membrane and migrating the hydroxide ions from the cathode electrolyte to the anode electrolyte. In some examples, the metal ion in the metal oxyanion is selected from the group consisting of: manganese, iron, chromium, selenium, copper, tin, silver, cobalt, uranium, lead, mercury, vanadium, bismuth, titanium, ruthenium, osmium, europium, zinc, cadmium, gold, nickel, palladium, platinum, rhodium, iridium, technetium, rhenium, molybdenum, tungsten, niobium, tantalum, zirconium, hafnium, and combination thereof. In some examples, the metal oxyanion with the metal ion in the lower oxidation state is selected from the group consisting of $MnO_4^{2-}$, $FeO_4^{2-}$, $RuO_4^{2-}$, $OsO_4^{2-}$, $HSnO_2^-$, $SeO_3^{2-}$, $Cu_2O$, $CrO_3^{3-}$, and $TeO_3^{2-}$. In some examples, the metal oxyanion with the metal ion in the higher oxidation state is selected from the group consisting of $MnO_4^-$, $HFeO_2^-$, $RuO_4^-$, $OsO_5^{2-}$, $SnO_3^{2-}$, $SeO_4^{2-}$, $CuO_2^{2-}$, $CrO_4^{2-}$, and $TeO_4^{2-}$. In some examples, the non-metal ion in the non-metal oxyanion is selected from the group consisting of halogen, carbon, sulfur, nitrogen, and phosphorus. In some examples, the non-metal oxyanion with the non-metal ion in the lower oxidation state is selected from the group consisting of $NO_2^-$, $PO_3^{3-}$, $SO_3^{2-}$, $ClO^-$, $ClO_2^-$, $ClO_3^-$, $BrO^-$, $BrO_2^-$, $BrO_3^-$, $IO^-$, $IO_2^-$, and $IO_3^-$ and/or the non-metal oxyanion with the non-metal ion in the higher oxidation state is selected from the group consisting of $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, and $IO_4^-$. In some examples, the method further comprises maintaining a steady-state pH differential between the anode electrolyte and the cathode electrolyte of from about 1 to about 6. In some examples, no oxygen gas is formed at the anode or less than 25% of the Faradaic efficiency is for the oxygen evolution reaction at the anode. In some examples, the method further comprises oxidizing hydroxide ions at the anode to form oxygen gas. In some example, the method further comprises operating the electrochemical cell at lower current density for the oxidation of the metal oxyanion with the metal ion in the lower oxidation state to the metal oxyanion with the metal ion in the higher oxidation state or for the oxidation of the non-metal oxyanion with the non-metal ion in the lower oxidation state to the non-metal oxyanion with the non-metal ion in the higher oxidation state at the anode; and operating the electrochemical cell at higher current density for the oxidation of the hydroxide ions at the anode to form oxygen gas. In some examples, the method further comprises subjecting the anode electrolyte comprising metal oxyanion with metal ion in the higher oxidation state or the anode electrolyte comprising non-metal oxyanion with non-metal ion in the higher oxidation state to a thermal reaction to form oxygen gas and the metal oxyanion with the metal ion in the lower oxidation state or the non-metal oxyanion with the non-metal ion in the lower oxidation state, respectively. In some examples, the thermal reaction is carried out in presence of the hydroxide ions; at a pH of more than 10; and/or in presence of a catalyst. In some examples, the method further comprises transferring at least a portion of the anode electrolyte comprising the metal oxyanion with the metal ion in the higher oxidation state or the non-metal oxyanion with the non-metal ion in the higher oxidation state outside the electrochemical cell to a second cathode electrolyte of a second electrochemical cell, and reducing the metal oxyanion with the metal ion in the higher oxidation state to the lower oxidation state or reducing the non-metal oxyanion with the non-metal ion in the higher oxidation state to the lower oxidation state at a second cathode of the second electrochemical cell. In some examples, the method further comprises migrating hydroxide ions from the second cathode electrolyte to a second anode electrolyte through an AEM in the second electrochemical cell and oxidizing the hydroxide ions at a second anode in the second electrochemical cell to form oxygen gas.

The present disclosure also describes a system to generate hydrogen gas, the system comprising:
an electrochemical cell comprising;
  an anode and an anode electrolyte comprising a metal oxyanion with a metal ion in a lower oxidation state or a non-metal oxyanion with a non-metal ion in a lower oxidation state wherein, the anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state; and
  a cathode and a cathode electrolyte comprising water wherein the cathode is configured to reduce water to form hydroxide ions and hydrogen gas.

In some examples, the system further comprises a thermal reactor operably connected to the electrochemical cell, wherein the thermal reactor is configured to receive at least a portion of the anode electrolyte comprising the metal oxyanion with the metal ion in the higher oxidation state or the non-metal oxyanion with the non-metal ion in the higher oxidation state and subject the portion of the anode electrolyte to thermal reaction to form oxygen gas and the metal oxyanion with the metal ion in the lower oxidation state or the non-metal oxyanion with the non-metal ion in the lower oxidation state, respectively. In some examples, the system further comprises an anion exchange membrane disposed between the anode electrolyte and the cathode electrolyte and configured to migrate the hydroxide ions from the cathode electrolyte to the anode electrolyte. In some examples, the electrochemical cell is configured to maintain a steady-state pH differential between the anode electrolyte and the cathode electrolyte of from about 1 to about 6. In some examples, the anode is further configured to oxidize the hydroxide ions to form oxygen gas.

The present disclosure also describes a method to generate hydrogen gas, the method comprising:
  providing an anode and an anode electrolyte in an electrochemical cell wherein the anode electrolyte comprises a metal oxyanion with a metal ion in a lower oxidation state or the anode electrolyte comprises a non-metal oxyanion with a non-metal ion in a lower oxidation state;
  oxidizing the metal oxyanion with the metal ion in the lower oxidation state to a metal oxyanion with metal ion in a higher oxidation state or oxidizing the non-metal oxyanion with the non-metal ion in the lower oxidation state to a non-metal oxyanion with non-metal ion in a higher oxidation state at the anode; and
  providing a cathode and a cathode electrolyte in the electrochemical cell and forming hydrogen gas at the cathode.

In some examples, the method further comprises transferring at least a portion of the anode electrolyte comprising the metal oxyanion with the metal ion in the higher oxidation state or the non-metal oxyanion with the non-metal ion in the higher oxidation state to a thermal reaction or to a second electrochemical reaction to generate oxygen gas. All these aspects and embodiments have been described herein.

The present disclosure also describes a method to generate hydrogen gas, the method comprising:
  providing an anode and an anode electrolyte in an electrochemical cell wherein the anode electrolyte comprises a metal oxyanion with a metal ion in a lower oxidation state or a non-metal oxyanion with a non-metal ion in a lower oxidation state;
  oxidizing the metal oxyanion with the metal ion in the lower oxidation state to a metal oxyanion with metal ion in a higher oxidation state or oxidizing the non-metal oxyanion with the non-metal ion in the lower oxidation state to a non-metal oxyanion with non-metal ion in a higher oxidation state at the anode;
  providing a cathode and a cathode electrolyte in the electrochemical cell and forming hydrogen gas at the cathode;
  transferring at least a portion of the anode electrolyte comprising the metal oxyanion with the metal ion in the higher oxidation state or the non-metal oxyanion with the non-metal ion in the higher oxidation state outside the electrochemical cell; and
  subjecting the portion of the anode electrolyte comprising the metal oxyanion with the metal ion in the higher oxidation state or the non-metal oxyanion with the non-metal ion in the higher oxidation state to a thermal reaction to form oxygen gas and the metal oxyanion with the metal ion in the lower oxidation state or the non-metal oxyanion with the non-metal ion in the lower oxidation state, respectively.

In some examples, the method further comprises reducing water at the cathode to form hydroxide ions and the hydrogen gas. In some examples, the method further comprises migrating hydroxide ions from the cathode electrolyte to the anode electrolyte. In some examples, the anode electrolyte further comprises hydroxide ions.

In some examples, the pH of the anode electrolyte is more than 10.

In some examples, the electrochemical cell has a theoretical voltage of less than 2 V.

In some examples, no oxygen gas is formed at the anode or less than 25% of the Faradaic efficiency is for the oxygen evolution reaction at the anode.

In some examples, corresponding cation for the metal oxyanion or the non-metal oxyanion is an alkali metal or an alkali earth metal. In some examples, the method further comprises migrating the alkali metal ion or the alkali earth metal ion from the anode electrolyte to the cathode electrolyte. In some examples, the method further comprises forming alkali metal hydroxide or alkali earth metal hydroxide in the cathode electrolyte. In some examples, the method further comprises migrating the cathode electrolyte comprising alkali metal hydroxide or alkali earth metal hydroxide to the thermal reaction.

In some examples, the thermal reaction is carried out in presence of hydroxide ions.

In some examples, an operating voltage of the electrochemical cell is lower than an operating voltage of a cell that forms oxygen gas at the anode. In some examples, the operating voltage of the electrochemical cell is lower than the operating voltage of a cell that forms oxygen gas at the anode due to one or more of lower over-potential, lower thermo-neutral voltage, lower half-cell potential, or combinations thereof.

In some examples, the anode electrolyte further comprises alkali metal halide or alkali earth metal halide.

In some examples, the method further comprises separating the anode from the cathode by an anion exchange membrane.

In some examples, the anode electrolyte further comprises water and the metal oxyanion or the non-metal oxyanion are partially or fully soluble in the anode electrolyte.

In some examples, the method further comprises separating the metal oxyanion or the non-metal oxyanion from the anode electrolyte before and/or after the thermal reaction.

In some examples, the metal ion in the metal oxyanion is selected from the group consisting of manganese, iron, chromium, selenium, copper, tin, silver, cobalt, uranium, lead, mercury, vanadium, bismuth, titanium, ruthenium, osmium, europium, zinc, cadmium, gold, nickel, palladium, platinum, rhodium, iridium, technetium, rhenium, molybdenum, tungsten, niobium, tantalum, zirconium, hafnium, and combination thereof. In some examples, the metal ion in the metal oxyanion is selected from the group consisting of manganese, chromium, copper, iron, tin, selenium, tantalum, and combinations thereof.

In some examples, the metal oxyanion with the metal ion in the lower oxidation state is selected from the group consisting of $MnO_4^{2-}$, $FeO_4^{2-}$, $RuO_4^{2-}$, $OsO_4^{2-}$, $HSnO_2^-$, $SeO_3^{2-}$, $Cu_2O$, $CrO_3^{3-}$, and $TeO_3^{2-}$.

In some examples, the metal oxyanion with the metal ion in the higher oxidation state is selected from the group consisting of $MnO_4^-$, $HFeO_2^-$, $RuO_4^-$, $OsO_5^{2-}$, $SnO_3^{2-}$, $SeO_4^{2-}$, $CuO_2^{2-}$, $CrO_4^{2-}$, and $TeO_4^{2-}$.

In some examples,
the metal oxyanion with the metal ion in the lower oxidation state is $MnO_4^{2-}$ and the metal oxyanion with the metal ion in the higher oxidation state is $MnO_4^-$;
the metal oxyanion with the metal ion in the lower oxidation state is $FeO_4^{2-}$ and the metal oxyanion with the metal ion in the higher oxidation state is $HFeO_2^-$;
the metal oxyanion with the metal ion in the lower oxidation state is $RuO_4^{2-}$ and the metal oxyanion with the metal ion in the higher oxidation state is $RuO_4^-$;
the metal oxyanion with the metal ion in the lower oxidation state is $OsO_4^{2-}$ and the metal oxyanion with the metal ion in the higher oxidation state is $OsO_5^{2-}$;
the metal oxyanion with the metal ion in the lower oxidation state is $HSnO_2^-$ and the metal oxyanion with the metal ion in the higher oxidation state is $SnO_3^{2-}$;
the metal oxyanion with the metal ion in the lower oxidation state is $SeO_3^{2-}$ and the metal oxyanion with the metal ion in the higher oxidation state is $SeO_4^{2-}$;
the metal oxyanion with the metal ion in the lower oxidation state is $Cu_2O$ and the metal oxyanion with the metal ion in the higher oxidation state is $CuO_2^{2-}$;
the metal oxyanion with the metal ion in the lower oxidation state is $CrO_3^{3-}$ and the metal oxyanion with the metal ion in the higher oxidation state is $CrO_4^{2-}$; or
the metal oxyanion with the metal ion in the lower oxidation state is $TeO_3^{2-}$ and the metal oxyanion with the metal ion in the higher oxidation state is $TeO_4^{2-}$.

In some examples, the non-metal ion in the non-metal oxyanion is selected from the group consisting of halogen, carbon, sulfur; nitrogen, and phosphorus. In some examples, the non-metal ion in the non-metal oxyanion is the halogen selected from chloro, fluoro, bromo, or iodo atoms.

In some examples, the non-metal oxyanion with the non-metal ion in the lower oxidation state is selected from the group consisting of $NO_2^-$, $PO_3^{3-}$, $SO_3^{2-}$, $ClO^-$, $ClO_2^-$, $ClO_3^-$, $BrO^-$, $BrO_2^-$; $BrO_3^-$, $IO^-$, $IO_2^-$, and $IO_3^-$.

In some examples, the non-metal oxyanion with the non-metal ion in the higher oxidation state is selected from the group consisting of $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, and $IO_4^-$.

In some examples,
the non-metal oxyanion with the non-metal ion in the lower oxidation state is $NO_2^-$ and the non-metal oxyanion with the non-metal ion in the higher oxidation state is $NO_3^-$;
the non-metal oxyanion with the non-metal ion in the lower oxidation state is $PO_3^{3-}$ and the non-metal oxyanion with the non-metal ion in the higher oxidation state is $PO_4^{3-}$;
the non-metal oxyanion with the non-metal ion in the lower oxidation state is $SO_3^{2}$ and the non-metal oxyanion with the non-metal ion in the higher oxidation state is $SO_4^{2-}$;
the non-metal oxyanion with the non-metal ion in the lower oxidation state is $ClO^-$ and the non-metal oxyanion with the non-metal ion in the higher oxidation state is $ClO_2^-$;
the non-metal oxyanion with the non-metal ion in the lower oxidation state is $ClO_2^-$ and the non-metal oxyanion with the non-metal ion in the higher oxidation state is $ClO_3^-$;
the non-metal oxyanion with the non-metal ion in the lower oxidation state is $ClO_3^-$ and the non-metal oxyanion with the non-metal ion in the higher oxidation state is $ClO_4^-$;
the non-metal oxyanion with the non-metal ion in the lower oxidation state is $BrO^-$ and the non-metal oxyanion with the non-metal ion in the higher oxidation state is $BrO_2^-$;
the non-metal oxyanion with the non-metal ion in the lower oxidation state is $BrO_3^-$ and the non-metal oxyanion with the non-metal ion in the higher oxidation state is $BrO_3^-$;
the non-metal oxyanion with the non-metal ion in the lower oxidation state is $BrO_3^-$ and the non-metal oxyanion with the non-metal ion in the higher oxidation state is $BrO_4^-$;
the non-metal oxyanion with the non-metal ion in the lower oxidation state is $IO^-$ and the non-metal oxyanion with the non-metal ion in the higher oxidation state is $IO_2^-$;
the non-metal oxyanion with the non-metal ion in the lower oxidation state is $IO_2^-$ and the non-metal oxyanion with the non-metal ion in the higher oxidation state is $IO_3^-$; or
the non-metal oxyanion with the non-metal ion in the lower oxidation state is $IO_3^-$ and the non-metal oxyanion with the non-metal ion in the higher oxidation state is $IO_4^-$.

In some examples, the concentration of the metal oxyanion or the non-metal oxyanion with the metal ion or the non-metal ion, respectively, in the lower oxidation state is between about 0.1 M to 1 M.

In some examples, the concentration of the metal oxyanion or the non-metal oxyanion with the metal ion or the non-metal ion, respectively, in the higher oxidation state is between about 0.2 M to 1.5 M.

In some examples, the operating voltage of the electrochemical cell is from about 1.5 V to about 2.5 V.

In some examples, the temperature of the electrochemical cell is from about 50° C. to about 100° C.

In some examples, the method further comprises carrying out the thermal reaction in presence of hydroxide ions. In some examples, the hydroxide ions are present as alkali metal hydroxide or alkali earth metal hydroxide.

In some examples, the method further comprises carrying out the thermal reaction at a pH of more than 10.

In some examples, the method further comprises carrying out the thermal reaction in presence of a catalyst. In some examples, the catalyst is a metal oxide. In some examples, the metal oxide is manganese oxide, ruthenium oxide, silicon oxide, iron oxide, or aluminum oxide.

In some examples, the temperature of the thermal reaction is from about 50° C. to about 500° C.

In some examples, the method further comprises, after the thermal reaction, re-circulating the metal oxyanion with the metal ion in the lower oxidation state or the non-metal oxyanion with the non-metal ion in the lower oxidation state back to the anode electrolyte in the electrochemical cell.

In some examples, the method further comprises providing a portion or all of heat used in the thermal reaction from another process selected from the group consisting of waste heat and/or clean source of heat selected from solar thermal process, a geothermal process, and/or a nuclear process.

In some examples, the method further comprises providing a portion or all of heat used in the thermal reaction from heat generated by compression of the hydrogen gas.

In some examples, the method further comprises providing a heat exchanger between the electrochemical cell and the thermal reaction that serves to recover heat from solution leaving the thermal reaction into stream entering the thermal reaction.

In some examples, the method further comprises operating at least one of the electrochemical cell or the thermal reaction at elevated pressure.

In some examples, operating the electrochemical cell at elevated pressure reduces cost of compression of the hydrogen gas and operating the thermal process at lower pressure facilitates oxygen evolution.

In some examples, the electrochemical cell is operated at a pressure of from about 40 psi to about 500 psi.

In some examples, the thermal reaction is operated at a pressure of from about 14 psi to about 300 psi.

In some examples, the method further comprises maintaining a steady-state pH differential of greater than 1 or pH differential of from about 1 to about 6 between the anode electrolyte and the cathode electrolyte.

The present disclosure also describes a method to generate hydrogen gas, the method comprising:
  providing a first anode and a first anode electrolyte in a first electrochemical cell wherein the first anode electrolyte comprises a metal oxyanion with a metal ion in a lower oxidation state or a non-metal oxyanion with a non-metal ion in a lower oxidation state;
  oxidizing the metal oxyanion with the metal ion in the lower oxidation state to a metal oxyanion with metal ion in a higher oxidation state or the non-metal oxyanion with the non-metal ion in the lower oxidation state to a non-metal oxyanion with non-metal ion in a higher oxidation state at the first anode;
  providing a first cathode and a first cathode electrolyte in the first electrochemical cell and forming hydrogen gas at the first cathode;
  transferring at least a portion of the first anode electrolyte comprising the metal oxyanion with the metal ion in the higher oxidation state or the non-metal oxyanion with the non-metal ion in the higher oxidation state outside the first electrochemical cell to a second cathode electrolyte of a second electrochemical cell;
  reducing the metal oxyanion with the metal ion in the higher oxidation state to the lower oxidation state or reducing the non-metal oxyanion with the non-metal ion in the higher oxidation state to the lower oxidation state at a second cathode of the second electrochemical cell; and
    migrating hydroxide ions from the second cathode electrolyte to a second anode electrolyte in the second electrochemical cell through an AEM in the second electrochemical cell and oxidizing the hydroxide ions at a second anode in the second electrochemical cell to form oxygen gas.

The present disclosure also describes a system to generate hydrogen gas, the system comprising:
  an electrochemical cell comprising;
    an anode and an anode electrolyte comprising a metal oxyanion with a metal ion in a lower oxidation state or a non-metal oxyanion with a non-metal ion in a lower oxidation state, wherein the anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state; and
    a cathode and a cathode electrolyte comprising water wherein the cathode is configured to reduce water to form hydroxide ions and hydrogen gas; and a thermal reactor operably connected to the electrochemical cell and configured to;
    receive at least a portion of the anode electrolyte comprising the metal oxyanion with the metal ion in the higher oxidation state or the non-metal oxyanion with the non-metal ion in the higher oxidation state and subject the portion of the anode electrolyte to a thermal reaction to form oxygen gas and the metal oxyanion with the metal ion in the lower oxidation state or the non-metal oxyanion with the non-metal ion in the lower oxidation state, respectively.

In some examples, the system further comprises an anion exchange membrane disposed between the anode electrolyte and the cathode electrolyte.

In some examples, the system further comprises a cation exchange membrane disposed between the anode electrolyte and the cathode electrolyte.

The present disclosure also describes a system to generate hydrogen gas, the system comprising:
  a first electrochemical cell comprising;
    a first anode and a first anode electrolyte comprising metal oxyanion with a metal ion in a lower oxidation state or a non-metal oxyanion with a non-metal ion in a lower oxidation state, wherein the first anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state; and
    a first cathode and a first cathode electrolyte comprising water wherein the first cathode is configured to reduce water to form hydroxide ions and hydrogen gas; and
  a second electrochemical cell operably connected to the first electrochemical cell, the second electrochemical cell comprising;
    a second anode and a second anode electrolyte;
    a second cathode and a second cathode electrolyte, wherein the second cathode electrolyte is configured to receive at least a portion of the first anode electrolyte of the first electrochemical cell comprising the metal oxyanion with the metal ion in the higher oxidation state or the non-metal oxyanion with the non-metal ion in the higher oxidation state and reduce the metal oxyanion with the metal ion in the higher oxidation state to form the metal oxyanion with the metal ion in the lower oxidation state or reduce the non-metal oxyanion with the non-metal ion in the higher oxidation state to form the non-metal oxyanion with the non-metal ion in the lower oxidation state, respectively.

In some examples, the second electrochemical cell further comprises an AEM configured to transfer hydroxide ions from the second cathode electrolyte to the second anode electrolyte of the second electrochemical cell and oxidize the hydroxide ions at the second anode of the second electrochemical cell to form oxygen gas.

In some examples, electrochemical cell is configured to maintain a steady-state pH differential of greater than 1 or from about 1 to about 6 between the anode electrolyte and the cathode electrolyte.

BRIEF DESCRIPTION OF THE DRAWINGS

The drawings illustrate generally, by way of example, but not by way of limitation, various embodiments discussed in the present document.

DETAILED DESCRIPTION

Figure 1:
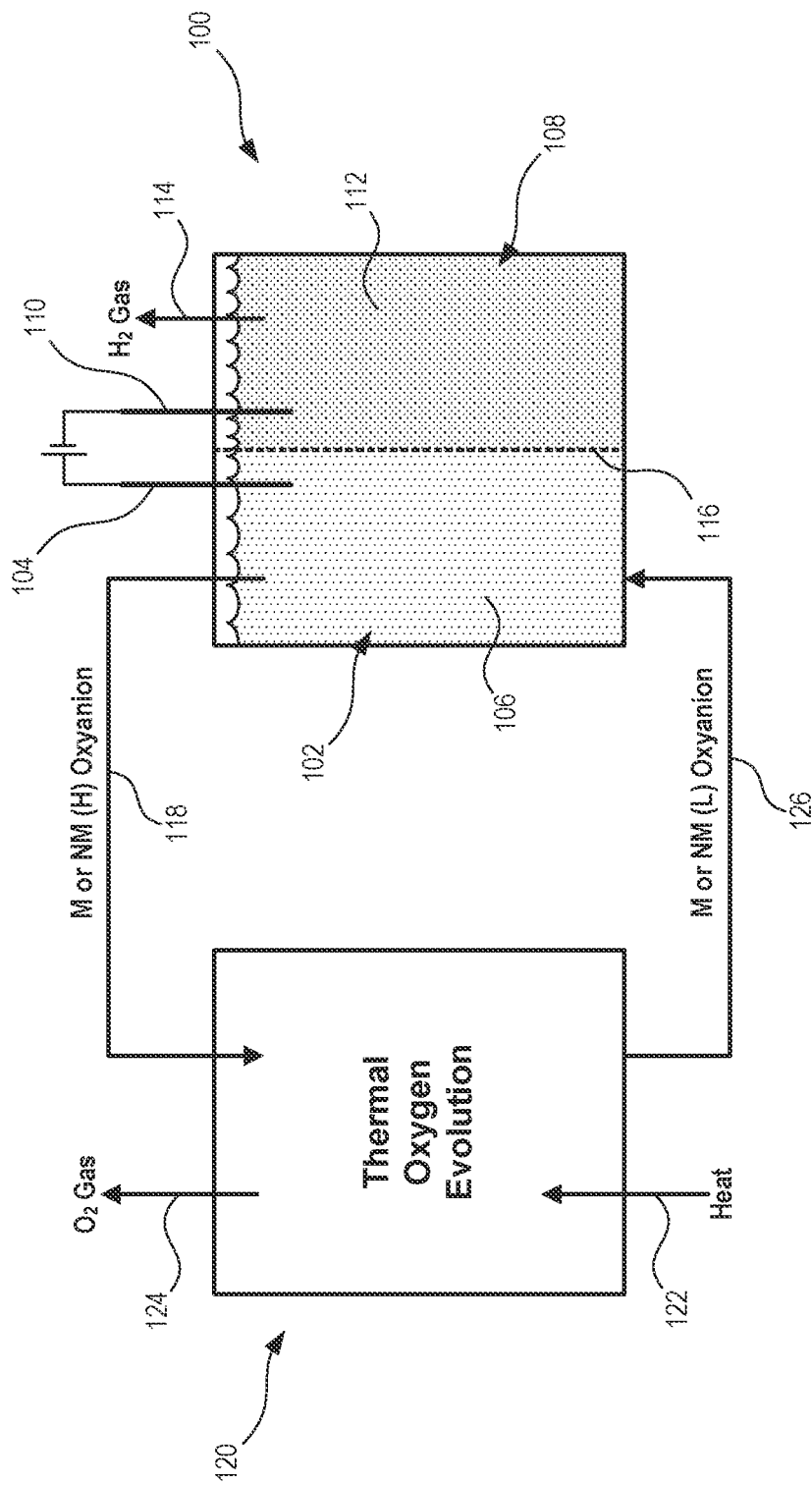
FIG. 1 is an illustration of an example system for the formation of hydrogen gas at a cathode; oxidation of a metal oxyanion or a non-metal oxyanion at an anode; and thermal reaction of the oxidized metal oxyanion or the oxidized non-metal oxyanion to form oxygen gas.

Disclosed herein are systems and methods that relate to environmentally friendly and low cost production of hydrogen gas and other commercially valuable products. Other commercially valuable products can include, but are not limited to, oxygen gas.

Hydrogen gas is formed electrochemically by a water splitting reaction where water is split into oxygen gas and hydrogen gas at an anode and a cathode of an electrochemical cell, respectively. Examples of such electrochemical processes include, without limitation, proton electrolyte membrane (PEM) electrolysis and alkaline water electrolysis (AWE). However, in such electrochemical reactions, operating energy of the cell is relatively high due to additional energy costs as a result of various energy inefficiencies. For example, to reduce unwanted migration of ionic species between the electrodes, the cathode and the anode may be separated by a component, such as a diaphragm or a membrane, which may reduce these migrations. Although the components may improve the overall efficiency of the cell, they may come at a cost of additional resistive losses in the cell which, in turn, may increase the operating voltage. Other inefficiencies in water electrolysis may include solution resistance losses, electric conduction inefficiencies, and/or electrode over-potentials, among others. These various inefficiencies and the capital costs associated with reducing them may play an important role in the economic viability of hydrogen generation via water splitting electrolysis.

In addition to the energy costs associated with the water splitting reaction as noted above, another important cost may be the cost of hydrogen compression. To be adopted as a viable transportation fuel, the hydrogen produced by water splitting electrolysis may also be delivered to fueling stations. For the delivery process to be practicable, the hydrogen generated by the water splitting electrolysis is compressed for transport and refueling. If hydrogen is to be used as a transportation fuel at scale, the refueling pressure may be expected to be from about 5,000 to about 10,000 psi. As a result, compression costs may represent a significant percentage of the overall cost of hydrogen gas production by electrolysis.

The methods and systems described herein relate to a unique combination of electrochemical and thermochemical or thermal processes and/or a combination of two electrochemical processes that when combined result in efficient, low cost, and low energy production of hydrogen gas.

As will be appreciated by those having skill in the art, it is to be understood that the invention is not limited to particular embodiments described herein, as such may, of course, vary. It is also to be understood that the terminology used herein is for the purpose of describing particular example embodiments only and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the range. The upper and lower limits of these smaller ranges may independently be included in the smaller ranges, subject to any specifically excluded limit in the stated range.

Where the stated range includes one or both of the limits, ranges excluding either or both of those included limits are also included in the range.

The term "about," as used herein, can allow for a degree of variability in a value or range, for example, within 10%, within 5%, within 1%, within 0.5%, within 0.1% within 0.05%, within 0.01%, within 0.005%, or within 0.001% of a stated value or of a stated limit of a range, and includes the exact stated value or limit of the range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

Unless defined otherwise, all technical and scientific terms used herein have the same meaning as commonly understood by one of ordinary skill in the art. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further; the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual examples described and illustrated herein have discrete components and features which may be readily separated from or combined with the features of any of the other several examples without departing from the scope or spirit of the present invention. Any recited method can be carried out in the order of events recited or in any other order which is logically possible.

Methods and Systems

Various methods and systems are described herein to produce hydrogen gas at a cathode and various reactions can be carried out at an anode, such as but not limited to: oxidation of a metal oxyanion, oxidation of a non-metal oxyanion, formation of oxygen gas, or a combination thereof.

In one aspect, a method to generate hydrogen gas comprises:
  providing an anode and an anode electrolyte comprising a metal oxyanion with a metal ion in a lower oxidation state or a non-metal oxyanion with a non-metal ion in a lower oxidation state in an electrochemical cell;
  oxidizing the metal oxyanion with the metal ion in the lower oxidation state to a metal oxyanion with metal ion in a higher oxidation state or the non-metal oxyanion with the non-metal ion in the lower oxidation state to a non-metal oxyanion with non-metal ion in a higher oxidation state at the anode; and
  providing a cathode and a cathode electrolyte in the electrochemical cell and forming hydrogen gas at the cathode.

In one aspect, a system to generate hydrogen gas comprises:
  an electrochemical cell comprising an anode and an anode electrolyte comprising a metal oxyanion with a metal ion in a lower oxidation state or a non-metal oxyanion with a non-metal ion in a lower oxidation state, wherein the anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state; and
  a cathode and a cathode electrolyte, wherein the cathode is configured to reduce water to form hydroxide ions and hydrogen gas.

In some examples, at least a portion of the anode electrolyte comprising the metal oxyanion with metal ion in the higher oxidation state or the non-metal oxyanion with the non-metal ion in the higher oxidation state, or both, is transferred outside the electrochemical cell and is either reduced thermally (e.g., in a thermal reactor) and/or electrochemically (e.g., in a second electrochemical cell) to form oxygen gas and a reduced form of the metal oxyanion or the non-metal oxyanion. Both the thermal reaction/reactor as well as the electrochemical reaction/cell to form the oxygen gas are described in more detail below. The thermal reaction/reactor and the second electrochemical reaction/cell to form the oxygen gas may be carried out simultaneously (both the thermal reaction and the second electrochemical reaction being carried out simultaneously), serially (both the thermal reaction and the second electrochemical reaction being carried out one after the other), or independently and all of these combinations are well within the scope of this disclosure.

In some examples, the method further comprises transferring at least a portion of the anode electrolyte comprising metal oxyanion with metal ion in the higher oxidation state or the non-metal oxyanion with the non-metal ion in the higher oxidation state outside the electrochemical cell, and subjecting the anode electrolyte to thermal reaction to form oxygen gas.

In some examples, the method further comprises transferring at least a portion of the anode electrolyte comprising the metal oxyanion with the metal ion in the higher oxidation state or the non-metal oxyanion with the non-metal ion in the higher oxidation state, or both, outside the electrochemical cell to a second cathode electrolyte of a second electrochemical cell, and reducing the metal oxyanion with the metal ion in the higher oxidation state to the lower oxidation state or reducing the non-metal oxyanion with the non-metal ion in the higher oxidation state to the lower oxidation state at a second cathode of the second electrochemical cell. In some examples, the method further comprises forming hydroxide ions at the second cathode of the second electrochemical cell and migrating hydroxide ions from the second cathode electrolyte to a second anode electrolyte of the second electrochemical cell through a second AEM in the second electrochemical cell, and oxidizing hydroxide ions at a second anode in the second electrochemical cell to form oxygen gas.

Further details regarding these method and system are described below. Various aspects and examples provided herein, are illustrated in FIGS. 1-7.

In one aspect, a method to generate hydrogen gas comprises:
providing an anode and an anode electrolyte in an electrochemical cell, wherein the anode electrolyte comprises a metal oxyanion with a metal ion in a lower oxidation state or a non-metal oxyanion with a non-metal ion in a lower oxidation state;
oxidizing the metal oxyanion with the metal ion in the lower oxidation state to a metal oxyanion with metal ion in a higher oxidation state or the non-metal oxyanion with the non-metal ion in the lower oxidation state to a non-metal oxyanion with the non-metal ion in a higher oxidation state at the anode;
providing a cathode and a cathode electrolyte in the electrochemical cell;
forming hydrogen gas at the cathode;
transferring at least a portion of the anode electrolyte comprising the metal oxyanion with the metal ion in the higher oxidation state or the non-metal oxyanion with the non-metal ion in the higher oxidation state outside the electrochemical cell; and
subjecting the portion of the anode electrolyte comprising the metal oxyanion with the metal ion in the higher oxidation state or the non-metal oxyanion with the non-metal ion in the higher oxidation state to a thermal reaction to form oxygen gas and the metal oxyanion with the metal ion in the lower oxidation state or the non-metal oxyanion with the non-metal ion in the lower oxidation state, respectively.

In one aspect, there is provided a system to generate hydrogen gas, the system comprising:
an electrochemical cell comprising;
an anode and an anode electrolyte comprising a metal oxyanion with a metal ion in a lower oxidation state or a non-metal oxyanion with a non-metal ion in a lower oxidation state wherein the anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state; and
a cathode and a cathode electrolyte comprising water wherein the cathode is configured to reduce water to form hydrogen gas; and
a thermal reactor operably connected to the electrochemical cell, wherein the thermal reactor is configured to receive at least a portion of the anode electrolyte comprising the metal oxyanion with the metal ion in the higher oxidation state or the non-metal oxyanion with the non-metal ion in the higher oxidation state and subject the portion of the anode electrolyte to thermal reaction to form oxygen gas and the metal oxyanion with the metal ion in the lower oxidation state or the non-metal oxyanion with the non-metal ion in the lower oxidation state, respectively.

The hydrogen gas may be captured and stored for commercial purposes. The oxygen gas may be vented out or captured and stored for commercial purposes.

Figure 2:
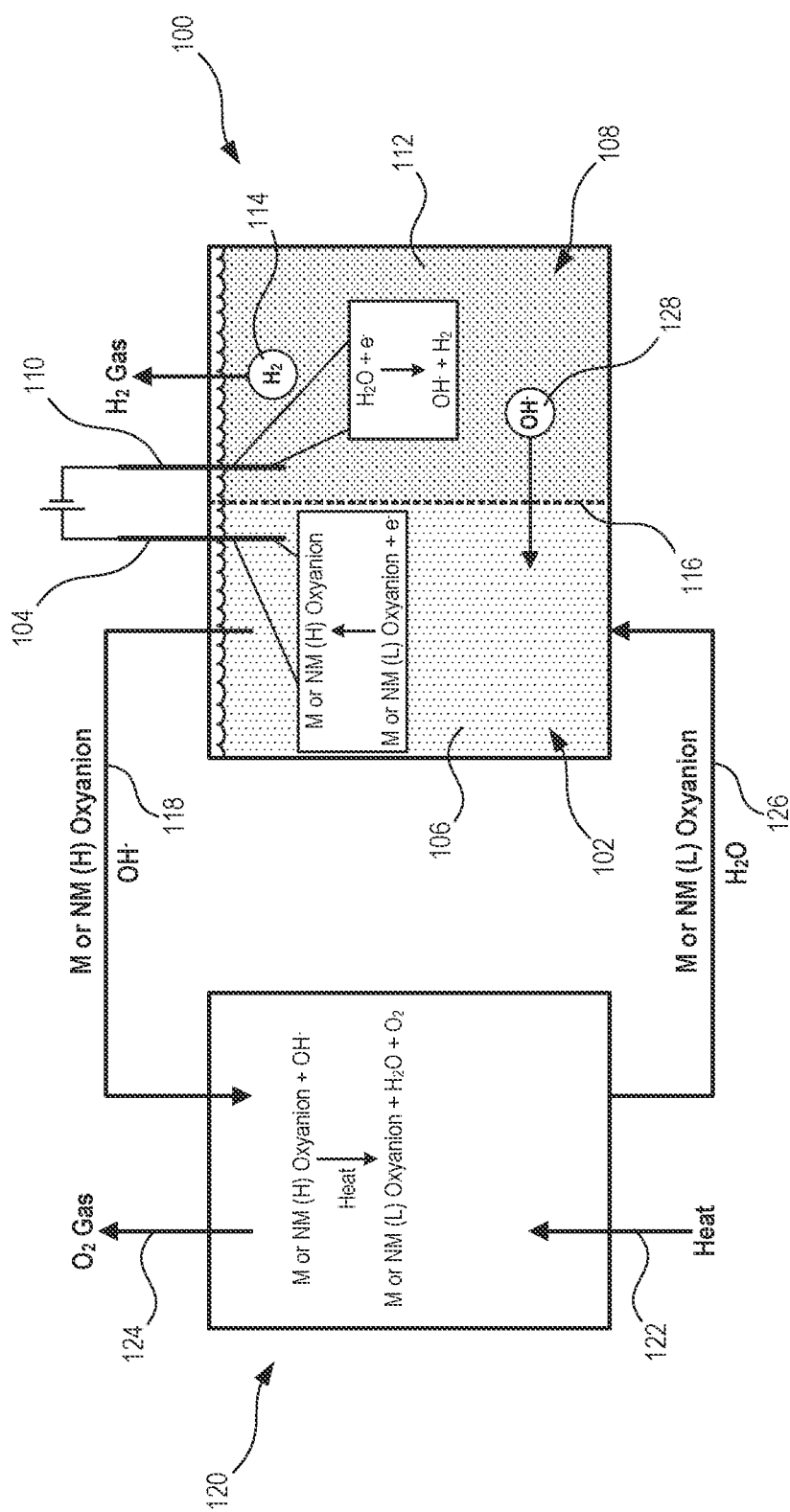
FIG. 2 is an illustration of an example system the formation of hydrogen gas and hydroxide ions at a cathode; migration of the hydroxide ions from the cathode electrolyte to the anode electrolyte; oxidation of a metal oxyanion or a non-metal oxyanion at an anode; and thermal reaction of the oxidized metal oxyanion or the oxidized non-metal oxyanion to form oxygen gas.

FIGS. 1 and 2 illustrate various aspects of an example electrochemical cell 100 with an anode chamber 102 containing an anode 104 and an anode electrolyte 106. The anode electrolyte 106 comprises one or more oxyanion compounds. In an example, the one or more oxyanion compounds comprises a metal oxyanion (metal represented as "M" in FIGS. 1 and 2) with the metal ion in a lower oxidation state (represented as "M(L) oxyanion" in FIGS. 1 and 2). In another example, the one or more oxyanion compounds in the anode electrolyte 106 comprises a non-metal oxyanion (non-metal represented as "NM" in FIGS. 1 and 2) with the non-metal ion in a lower oxidation state (represented as "NM (L) oxyanion" in FIGS. 1 and 2). The electrochemical cell 100 also includes a cathode chamber 108 containing a cathode 110 and a cathode electrolyte 112 (also referred to herein as "catholyte 112"). A membrane 116 or other separator separates the anode chamber 102 from the cathode chamber 108.

If present, the metal oxyanion with the metal ion in the lower oxidation state (M(L) oxyanion) is oxidized to the metal oxyanion with the metal ion in the higher oxidation state (M(H) oxyanion) at the anode 104. Similarly, if present, the non-metal oxyanion with the non-metal ion in the lower oxidation state (represented as NM(L) oxyanion) is oxidized to the non-metal oxyanion with the non-metal ion in the higher oxidation state (represented as NM(H) oxyanion) at the anode 104. Hydrogen gas 114 is formed at the cathode. The solution 118 comprising at least a portion of the anode electrolyte that now contains the metal oxyanion with the metal ion in the higher oxidation state (M(H) oxyanion) or the non-metal oxyanion with the non-metal ion in the higher oxidation state (NM(H) oxyanion), or both, is transferred outside the electrochemical cell 102 to a thermal reactor 120 where the solution 118 is subjected to a thermal reaction. The thermal reaction of the anode electrolyte solution 118 containing the oxyanion compound in the higher oxidation state, i.e., the M(H) oxyanion, the NM(H) oxyanion, or both, includes heating the anode electrolyte 106 (e.g., adding heat 122), which results in evolution of oxygen gas 124 along with reduction of the metal oxyanion with the metal ion in the higher oxidation state (MH) oxyanion) or the non-metal oxyanion with the non-metal ion in the higher oxidation state (NM(H) oxyanion), or both, to form the metal oxyanion with the metal ion in the lower oxidation state (M(L) oxyanion) or the non-metal oxyanion with the non-metal ion in the lower oxidation state (NM(L) oxyanion), or both, respectively. At least a portion of the resulting solution 126 of the anode electrolyte and the metal oxyanion with the metal ion in the lower oxidation state (M(L) oxyanion) or the non-metal oxyanion with the non-metal ion in the lower oxidation state (NM(L) oxyanion) can be transferred back to the anode chamber 108 of the electrochemical cell 100 so that the oxyanion compound in the lower oxidation state, i.e., the metal oxyanion with the metal ion in the lower oxidation state (M(L) oxyanion) or the non-metal oxyanion with the non-metal ion in the lower oxidation state (NM(L) oxyanion), or both, in the solution 126 can be oxidized at the anode 104 to once again form the oxyanion compound in the higher oxidation state, i.e., the metal oxyanion with the metal ion in the higher oxidation state (M(H) oxyanion) or the non-metal oxyanion with the non-metal ion in the higher oxidation state (NM(H) oxyanion) or both.

The term "metal oxyanion," as used herein, refers to a polyatomic anion containing two or more atoms wherein at least one atom is a metal and at least one other atom is oxygen. The term "non-metal oxyanion," as used herein, refers to a polyatomic anion containing two or more atoms wherein at least one atom is a non-metal and at least one other atom is an oxygen. Various examples of the metal oxyanion or the non-metal oxyanion are provided below. It is to be understood that the metal oxyanion or the non-metal oxyanion may contain any number of metal or non-metal atoms, respectively, and any number of oxygen atoms depending on the permissible valences. Non-metal atoms that can be part of the non-metal oxyanion include, but are not limited to: a halogen (e.g., fluorine (F), chlorine (Cl), bromine (Br), or iodine (I)), carbon (C), sulfur (S), nitrogen (N), and phosphorus (P).

In some examples, the anode electrolyte solution 118 comprises both the one or more oxyanion compounds in the lower oxidation state (e.g., as part of the original feedstock that forms the anode electrolyte solution 106) and the one or more oxyanion compounds in the higher oxidation state (e.g., formed after oxidation at the anode 104). In some For example, if the feedstock anode electrolyte 106 comprises a metal oxyanion, then the anode electrolyte solution 118 can include both unreacted metal oxyanion with the metal ion in the lower oxidation state (M(L) oxyanion) and oxidized metal oxyanion with the metal ion in the higher oxidation state (M(H) oxyanion). Similarly, if the feedstock anode electrolyte 106 comprises a non-metal oxyanion, then the anode electrolyte solution 118 can include both unreacted non-metal oxyanion with the non-metal ion in the lower oxidation state (NM(L) oxyanion) and oxidized non-metal oxyanion with the non-metal ion in the higher oxidation state (NM(H) oxyanion).

The use of the metal oxyanion or the non-metal oxyanion as a redox metal or non-metal (e.g., going from the lower oxidation state to the higher oxidation state and vice versa), as described herein, can allow the operating voltage of the electrochemical cell 100 to be lower even if the half-cell voltage is above that for the oxygen generation. Typically, oxygen generation at the anode in the same cell where hydrogen gas is being generated at the cathode may require an over-potential at the anode beyond the theoretical minimum in order to generate the molecular oxygen at reasonable current densities. Therefore, reducing the required over-potential in the aspects provided herein, related to the oxidation of the one or more oxyanion compounds at the anode, can lower the operating voltage even if the theoretical voltage is slightly higher.

The formation of the metal oxyanion with the metal ion in the higher oxidation state (M(H) oxyanion) or the non-metal oxyanion with the non-metal ion in the higher oxidation state (NM(H) oxyanion) may also be a non-catalytic electron transfer step, e.g., the oxidation of the metal or the non-metal ion. The oxidized metal oxyanion or the non-metal oxyanion is transported outside of the cell, e.g., to the thermal reactor 120, where oxygen gas can then be liberated from the oxidized metal oxyanion or the non-metal oxyanion using heat 122 so that the required energy for oxygen gas formation can be provided thermally. As noted above, this type of change in half-cell reaction to oxidize the metal and/or the non-metal ion of the one or more oxyanion compounds from the lower oxidation state to the higher oxidation state can result in a lower operating voltage even if the fundamental half-cell potential is higher because of savings on the over-potential.

The oxidation of the metal or the non-metal ion of the metal oxyanion or the non-metal oxyanion, respectively, from the lower oxidation state to the higher oxidation state can further reduce the operating voltage by reducing thereto-neutral voltage. Typically, if heat is supplied from a source other than resistive losses in the electrochemical cell 100, the cell 100 can operate at lower voltages. However, resistive losses that add heat into the cell 100 may not be considered as losses until the cell voltage exceeds the thereto-neutral voltage. By oxidizing the metal or the non-metal oxyanion at the anode 104, it may be possible to lower the operating voltage by reducing the thereto-neutral voltage. For example, oxidizing the metal oxyanion or the non-metal oxyanion at the anode 104 can lower the overall voltage by lowering the thermo-neutral voltage below about 1.48 V. The lower thermo-neutral voltage, as described herein, can be used to lower the overall operating voltage of the electrochemical cell 100.

The reduction of the operating voltage may also be the result of a lower half-cell potential than what would be required for oxygen evolution at the anode 106 or for hydrogen evolution at the cathode 110. Because the Gibbs Free Energy may include minimum external work required to accomplish a given transformation (e.g., conversion of water into hydrogen and oxygen), operation below the thermodynamic minimum voltage may be possible if additional energy is provided into the system either as work or as heat. If the heat is obtained from a source other than resistive losses (these losses may include, but not limited to, the losses within the membrane 116, conductive resistances, solution resistances, and electrode overpotentials) within the cell 100, the net effect will be a reduced demand in electric power.

Accordingly, in some examples, no oxygen gas is formed at the anode 104 of the electrochemical cell 100. In another example, less than 25% of the Faradaic efficiency of the electrochemical cell 100 is for the oxygen evolution reaction at the anode 104.

In some examples, the cathode electrolyte 112 comprises water, which is reduced at the cathode 110 to from hydroxide ions and hydrogen gas 114. In some examples, the membrane 116 that separates the anode electrolyte 106 in the anode chamber 102 and the cathode electrolyte 112 in the cathode chamber 108 is an anion exchange membrane (AEM) or a diaphragm. In some examples, the hydroxide ions formed by the reduction of the water migrate from the cathode electrolyte 112 in the cathode chamber 108 to the anode electrolyte 106 in the anode chamber 102 through the AEM or the diaphragm 116.

In some examples, the anode electrolyte solution 118 that is transferred from the electrochemical cell 100 further comprises hydroxide ions. This aspect is illustrated in the system shown in FIG. 2. As can be seen, FIG. 2 illustrates the electrochemical cell 100 includes the anode chamber 102 containing the anode 104 and the anode electrolyte 106, which as described above comprises one or more oxyanion compounds, such as a metal oxyanion or non-metal oxyanion. The electrochemical cell 100 in FIG. 2 also includes the cathode chamber 108 containing the cathode 110 and a cathode electrolyte 112. The electrochemical cell 100 can have any configuration capable of oxidizing the one or more oxyanion compounds (e.g., the metal oxyanion with the metal ion or the non-metal oxyanion with the non-metal ion) at the anode 104. The metal oxyanion with the metal ion in the lower oxidation state (M(L) oxyanion) or the non-metal oxyanion with the non-metal ion in the lower oxidation state (NM(L) oxyanion), or both, is oxidized to form the metal oxyanion with the metal ion in the higher oxidation state (as M(H) oxyanion) or the non-metal oxyanion with the non-metal ion in the lower oxidation state (NM(L) oxyanion), or both, respectively at the anode 104 and hydrogen gas 114 is formed at the cathode 110, e.g., by electrolysis of water ($H_2O$) into hydroxide ions (OW) and the hydrogen gas 114. In some examples, the anode electrolyte 106 comprises the one or more oxyanion compounds (e.g., the metal oxyanion or the non-metal oxyanion, or both) and water. In other examples, the anode electrolyte 106 comprises the one or more oxyanion compounds and salt water (further described below). In some examples, the presence of salt in the non-metal oxyanion system (e.g., alkali metal halides salt is described below) may improves the efficiency of the thermal process.

The electrochemical cell 100 contains the anode chamber 102 and the cathode chamber 108 separated by the anion exchange membrane (AEM), depicted as a vertical dashed line 116 in FIG. 2. In the example of FIG. 2 described herein, the AEM 116 is used rather than a proton electrolyte membrane (PEM) is used to separate the electrode chambers 102, 108. The use of the AEM 116 reduces or minimizes the transport of the metal oxyanion with the metal ion or the non-metal oxyanion with the non-metal ion that is present in the anode electrolyte 106 from the anode chamber 102 to the cathode chamber 108, reducing or minimizing contamination of the cathode electrolyte 112 and improving the efficiency of the process. The cathode electrolyte 113 can comprise water, wherein the cathode 114 reduces the water to form hydrogen gas 114 and hydroxide ions 128 (shown as OH⁻ 128 in FIG. 2). In some examples, the hydroxide ions 128 transfer or migrate through the AEM 116 from the cathode electrolyte 112 in the cathode chamber 108 into the anode electrolyte 106 in the anode chamber 102. The resulting anode electrolyte solution 118, which comprises the metal oxyanion with the metal ion in the higher oxidation state (M(H) oxyanion) or the non-metal oxyanion with the non-metal ion in the higher oxidation state (NM(H) oxyanion), or both, and the hydroxide ions 128, is transferred outside the electrochemical cell 100, e.g., to the thermal reactor 120, where the anode electrolyte solution 118 is subjected to a thermal reaction where evolution of oxygen gas 124 takes place along with reduction of the metal oxyanion with the metal ion in the higher oxidation state (M(H) oxyanion) or the non-metal oxyanion with the non-metal ion in the higher oxidation state (NM(H) oxyanion), or both, to form the metal oxyanion with the metal ion in the lower oxidation state (M(L) oxyanion) or the non-metal oxyanion with the non-metal ion in the lower oxidation state (NM(L) oxyanion_, or both, respectively. In an example, the resulting solution 126 comprising these metal oxyanion with the metal ion in the lower oxidation state (M(L) oxyanion) or the non-metal oxyanion with the non-metal ion in the lower oxidation state (NM(L) oxyanion) may be transferred back to the anode chamber 102 of the electrochemical cell 100 where the solution 126 is combined with the anode electrolyte 106 already present in the anode chamber 102.

In some examples, the transfer of the solution 118 that includes the metal oxyanion with the metal ion in the higher oxidation state (M(H) oxyanion) or the non-metal oxyanion with the non-metal ion in the higher oxidation state (NM(H) oxyanion) from the anode chamber 102 to the thermal process (e.g., the thermal reactor 120) can be in solid form or in solution form. In some examples, the metal oxyanion with the metal ion in the lower oxidation state (M(L) oxyanion) and/or in the higher oxidation state (M(H) oxyanion) or the non-metal oxyanion with the non-metal ion in the lower oxidation state (NM(L) oxyanion) and/or in the higher oxidation state (NM(H) oxyanion) may be partially or fully insoluble in the anode electrolyte 106. In some examples, the metal oxyanion or the non-metal oxyanion may or may not be separated from the anode electrolyte 106. Various known techniques can be used for the separation including, but not limited to, techniques for liquid-solid separation, e.g., filtration.

The methods and systems described herein are sometimes closed-loop processes, and the order of one or more steps provided herein can be alternated or rearranged and the steps are not necessarily arranged in a serial fashion.

Figure 3:
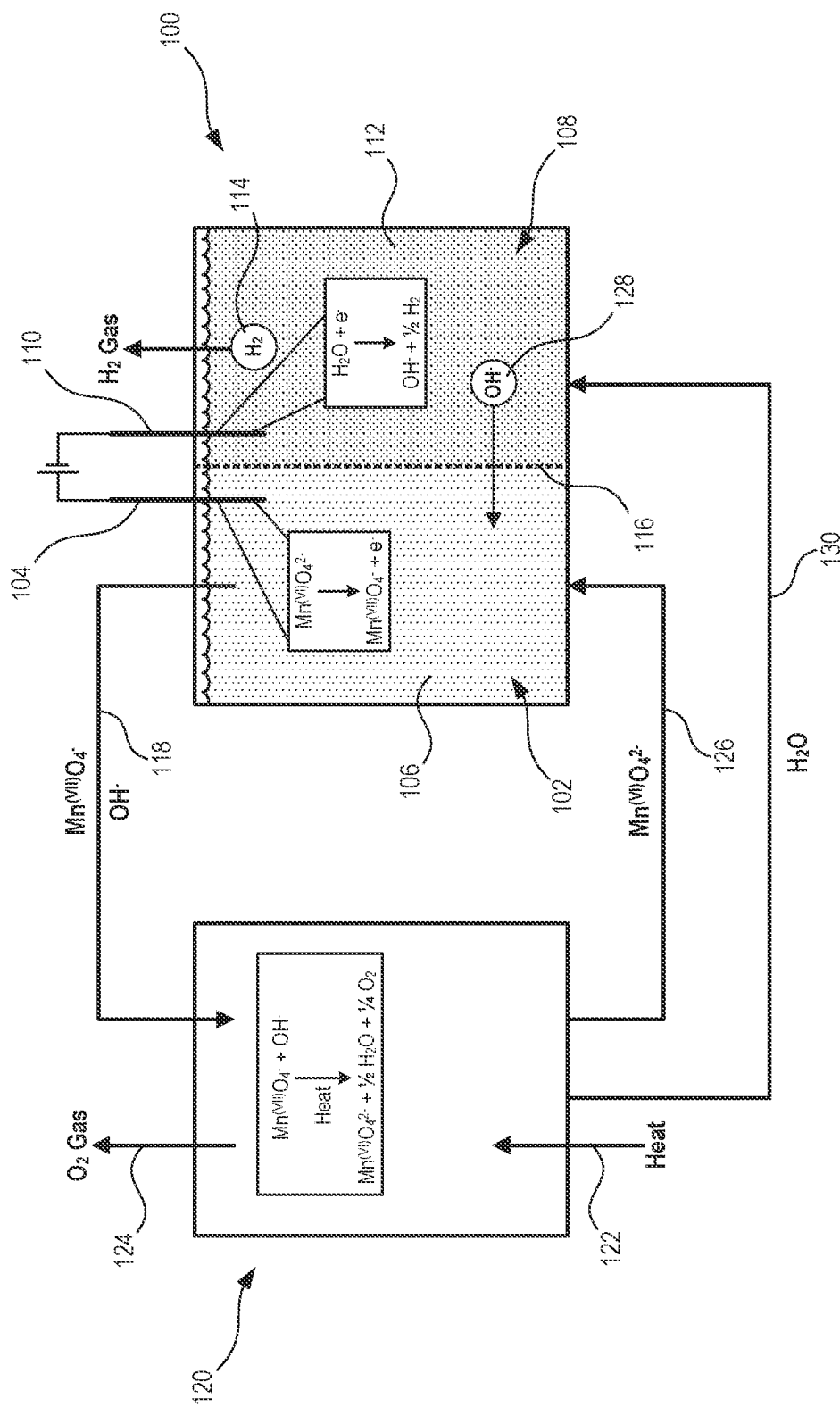
FIG. 3 is an illustration of an example system for the formation of hydrogen gas and hydroxide ions at a cathode; migration of the hydroxide ions from the cathode electrolyte to the anode electrolyte; and oxidation of manganate ion to permanganate ion at an anode.

The metal ion or the non-metal ion in the metal oxyanion or the non-metal oxyanion can be any redox metal or non-metal. Various examples of the metal or the non-metal or the metal ion or the non-metal ion are described herein. In some examples, the metal oxyanion with the metal ion in the lower oxidation state (M(L) oxyanion) or the non-metal oxyanion with the non-metal ion in the lower oxidation state (MAL) oxyanion), or both, enters the anode chamber 102 of the electrochemical cell 100 where it is oxidized to the higher oxidation state (M(H) oxyanion or NM(H) oxyanion, or both) at the anode 104. In an illustrative example, the oxyanion compound comprises a metal oxyanion with a manganese-containing metal ion. The oxidation of the manganese oxyanion is shown in the half cell reactions below:

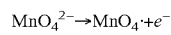  Anode Reaction:

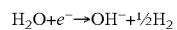  Cathode Reaction:

The aforementioned illustrative example is illustrated in FIG. 3. In the above noted reaction, at the anode 104, the metal oxyanion with Mn in a lower oxidation state is a manganate ion ($MnO_4^{2-}$), which is oxidized to form the metal oxyanion with Mn in a higher oxidation state in the form of a permanganate ion ($MnO_4^-$). At the cathode 110, water is reduced to hydrogen gas 114 and hydroxide ions 128. The hydroxide ions 128 migrate from the cathode electrolyte 112 in the cathode chamber 108 to the anode electrolyte 106 in the anode chamber 102 through the AEM 116. The anode electrolyte solution 118 containing the higher oxidation state permanganate ion ($MnO_4^-$) and the hydroxide ions is then transferred out of the anode chamber 102 and is transferred to the thermal reactor 120 to form the oxygen gas 124 and the lower oxidation state manganate ion as follows:

  Thermal reaction:

An overall reaction of the $MnO_4^{2-}/MnO_4^-$ system is as shown below:

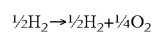  Overall:

The water 130 formed in the thermal reactor 120 can be partially or fully transferred to the cathode chamber 108 of the electrochemical cell 100 (shown in FIG. 3).

In some examples, the pH of the anode electrolyte 106 in the anode chamber 102 may affect oxidation of the metal oxyanion or the non-metal oxyanion and/or the oxidation of the hydroxy ions to form the oxygen gas 124 in the thermal reactor 120, over any other competing oxidation reaction. In an example, the pH of the anode electrolyte 106 is more than about 5, for example more than about 6, such as more than about 7, for example more than about 8, such as more than about 9, for example more than about 10, such as from about 5 to about 15, for example from about 5 to about 10, such as from about 5 to about 9, for example from about 9 to about 15, such as from about 9 to about 14, for example from about 9 to about 13, such as from about 9 to about 12, for example from about 9 to about 11, such as from about 9 to about 10, for example from about 10 to about 12, such as from about 10 to about 14, for example from about 10 to about 11.5, such as from about 11 to about 15, for example about 9, such as about 10, for example about 11, such as about 11.5. In some examples, the pH of the anode electrolyte 106 may facilitate oxidation of the metal oxyanion or the non-metal oxyanion over the oxidation of the hydroxide ions 128 migrating from the cathode electrolyte 112 to the anode electrolyte 106. In some examples, the method further comprises maintaining a steady-state pH differential of greater than 1 between the anode electrolyte 106 and the cathode electrolyte 112, such as a. pH differential of from about 1 to about 6.

In some examples, the thermal reactor 120 to generate the oxygen gas 124 can be replaced by a second electrochemical cell which provides for an electrochemical reaction to reduce the metal oxyanion with the metal ion in the higher oxidation state (M(H) oxyanion) to the metal oxyanion with the metal ion in the lower oxidation state (M(L) oxyanion) or to reduce the non-metal oxyanion with the non-metal ion in the higher oxidation state (NM(H) oxyanion) to the non-metal oxyanion with the non-metal ion in the lower oxidation state (NM(L) oxyanion), or both.

In one aspect, a method to generate hydrogen gas comprises:
    providing a first anode and a first anode electrolyte in a first electrochemical cell wherein the first anode electrolyte comprises a metal oxyanion with a metal ion in a lower oxidation state or a non-metal oxyanion with a non-metal ion in a lower oxidation state;
    oxidizing the metal oxyanion with the metal ion in the lower oxidation state to a metal oxyanion with metal ion in a higher oxidation state or the non-metal oxyanion with the non-metal ion in the lower oxidation state to a non-metal oxyanion with non-metal ion in a higher oxidation state at the first anode;
    providing a first cathode and a first cathode electrolyte in the first electrochemical cell and forming hydrogen gas at the first cathode;
    transferring at least a portion of the first anode electrolyte comprising the metal oxyanion with the metal ion in the higher oxidation state or the non-metal oxyanion with the non-metal ion in the higher oxidation state outside the first electrochemical cell to a second cathode electrolyte of a second electrochemical cell; and
    reducing the metal oxyanion with the metal ion in the higher oxidation state to the lower oxidation state or reducing the non-metal oxyanion with the non-metal ion in the higher oxidation state to the lower oxidation state at a second cathode of the second electrochemical cell.

In some examples, the method further comprises migrating hydroxide ions from the second cathode electrolyte to the second anode electrolyte through a second AEM in the second electrochemical cell and oxidizing the hydroxide ions at the second anode in the second electrochemical cell to form oxygen gas.

In some examples, the method further comprises transferring hydroxide ions from the first cathode electrolyte to the first anode electrolyte through a first AEM in the first electrochemical cell. In some examples, the method further comprises transferring at least a portion of the second cathode electrolyte of the second electrochemical cell (comprising the metal oxyanion with the metal ion in the lower oxidation state (M(L) oxyanion) or the non-metal oxyanion with the non-metal ion in the lower oxidation state (NM(L) oxyanion), or both) back to the first anode chamber of the first electrochemical cell.

In one aspect, a systems to generate hydrogen gas comprises:
    a first electrochemical cell comprising;
        a first anode and a first anode electrolyte comprising a metal oxyanion with a metal ion in a lower oxidation state or a non-metal oxyanion with a non-metal ion in a lower oxidation state, wherein the first anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state; and
        a first cathode and a first cathode electrolyte comprising water wherein the first cathode is configured to reduce water to form hydroxide ions and hydrogen gas; and
    a second electrochemical cell operably connected to the first electrochemical cell, the second electrochemical cell comprising
        a second anode and a second anode electrolyte;
        a second cathode and a second cathode electrolyte, wherein the second cathode electrolyte is configured to receive at least a portion of the first anode electrolyte of the first electrochemical cell comprising the metal oxyanion with the metal ion in the higher oxidation state or the non-metal oxyanion with the non-metal ion in the higher oxidation state, and wherein the second cathode is configured to reduce the metal oxyanion with the metal ion in the higher oxidation state to the metal oxyanion with the metal ion in the lower oxidation state or to reduce the non-metal oxyanion with the non-metal ion in the higher oxidation state to form the non-metal oxyanion with the non-metal ion in the lower oxidation state, respectively.

In some examples, the system further comprises a first AEM between the first anode and the first cathode in the first electrochemical cell and/or a second AEM between the second anode and the second cathode in the second electrochemical cell. The first AEM or the second AEM, or both, can be configured to transfer the hydroxide ions from the corresponding cathode electrolyte to the corresponding anode electrolyte through the first AEM or the second AEM, or both. In some examples, in the system, the second anode in the second electrochemical cell is configured to oxidize the hydroxide ions to form oxygen gas.

In some examples, the first electrochemical cell and the second electrochemical cell operate at different currents and voltages to selectively perform their respective anode reactions.

Figure 4:
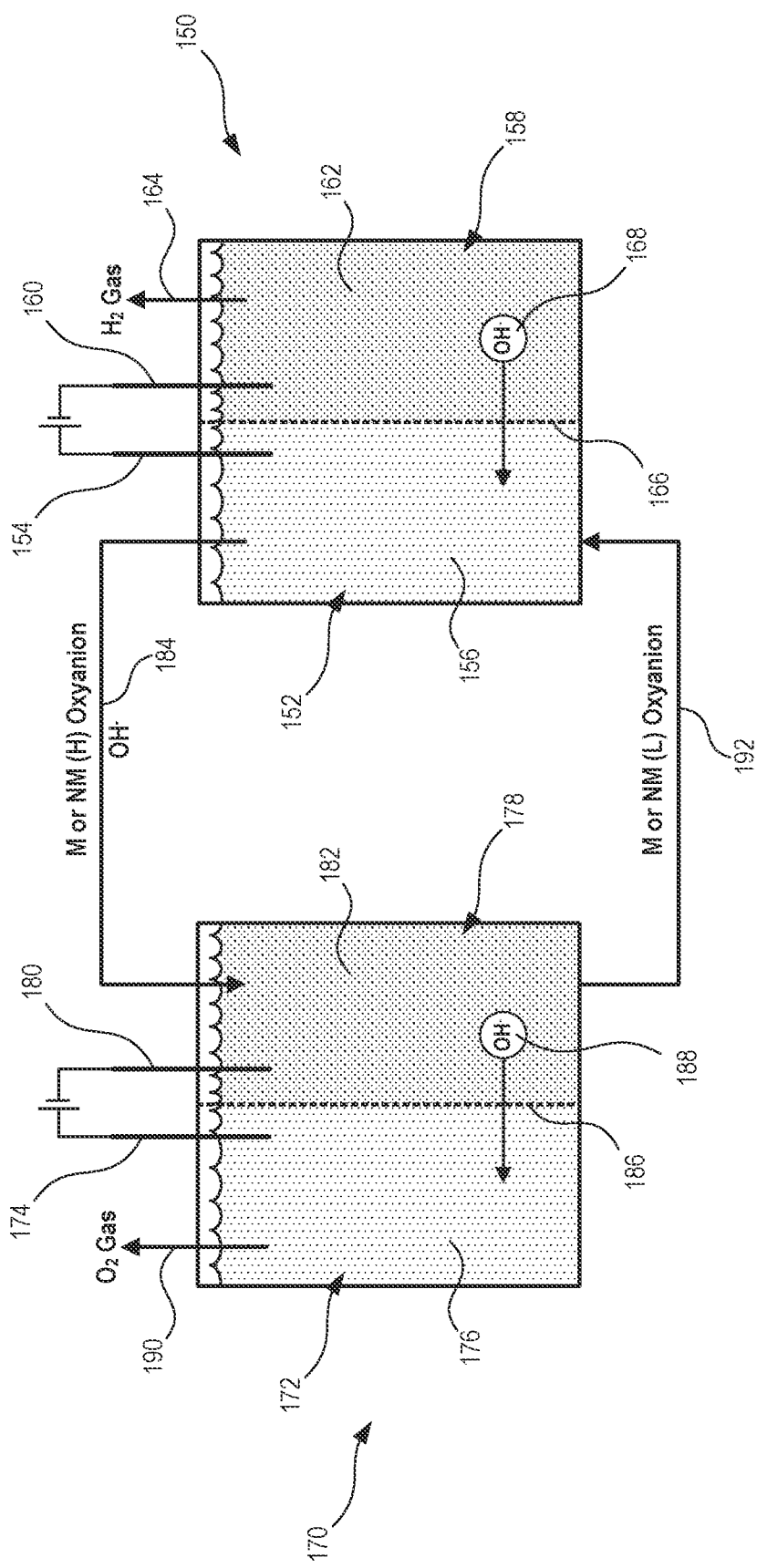
FIG. 4 is an illustration of an example system for the formation of hydrogen gas at a cathode of a first electrochemical cell; oxidation of a metal oxyanion or a non-metal oxyanion at an anode of the first electrochemical cell; and reduction of the oxidized metal oxyanion or the oxidized non-metal oxyanion at a cathode of a second electrochemical cell.

The aforementioned method and system are illustrated in FIG. 4. As can be seen in FIG. 4, the system includes a first electrochemical cell 150 and a second electrochemical cell 170. The first electrochemical cell 150 can be is substantially similar or identical to the electrochemical cell 100 described above with respect to FIGS. 1-3. For example, the first electrochemical cell 150 can include a first anode chamber 152 that contains a first anode 154 and a first anode electrolyte 156, a first cathode chamber 158 that contains a first cathode 160 and a first cathode electrolyte 162, and a first membrane (such as an AEM) 166 between the first anode chamber 152 and the first cathode chamber 158. The second electrochemical cell 170 can have a general structure that is similar to that of the first electrochemical cell 150. For example, the second electrochemical cell 170 can include a second anode chamber 172 that contains a second anode 174 and a second anode electrolyte 176, a second cathode chamber 178 that contains a second cathode 180 and a second cathode electrolyte 182, and a second membrane (such as an AEM) 186 between the second anode chamber 172 and the second cathode chamber 178 In some examples, at least a portion of the second anode electrolyte 156, which comprising the one or more oxyanion compounds in the higher oxidation state (e.g., the metal oxyanion with the metal ion in the higher oxidation state (M(H) oxyanion) or the non-metal oxyanion with the non-metal ion in the higher oxidation state (NM(H) oxyanion), or both) is transferred from the first anode chamber 152 of the first electrochemical cell 100 as the anode electrolyte solution 184. The anode electrolyte solution 184 is added to the second cathode electrolyte 182 of the second electrochemical cell 170. In the second electrochemical cell 170, the one or more oxyanion compounds in a higher oxidation state (e.g., the metal oxyanion with the metal ion in the higher oxidation state (M(H) oxyanion) or the non-metal oxyanion with the non-metal ion in the higher oxidation state (NM(H) oxyanion, or both) are reduced to form one or more oxyanion compounds in a lower oxidation state (e.g., the metal oxyanion with the metal ion in the lower oxidation state (M(L) oxyanion) or the non-metal oxyanion with the non-metal ion in the lower oxidation state (NM(L) oxyanion, or both), at the second cathode 180. In the second electrochemical cell 200, hydroxide ions 188 that are also formed at the second cathode 180 can migrate from the second cathode electrolyte 182 in the second cathode chamber to the second anode electrolyte 176 in the second anode chamber 172 through the second AEM 186. The second anode 174 oxidizes the hydroxide ions 188 to form oxygen gas 190. At least a portion of the second cathode electrolyte 182, which includes the metal oxyanion with the metal ion in the lower oxidation state (M(L) oxyanion) or the non-metal oxyanion with the non-metal ion in the lower oxidation state (NM(L) oxyanion), or both, after reduction of the one or more oxyanion compounds in the higher oxidation state at the second cathode 180, can be transferred back to the anode chamber 152 of the first electrochemical cell 150 as a cathode electrolyte solution 192.

Applicants have found unique methods and systems whereby maintaining a steady-state pH differential between the anode electrolyte and the cathode electrolyte, e.g., increasing the pH of the anode electrolyte and/or decreasing the pH of the cathode electrolyte, the sum of the reactions at the anode and the cathode may result in a theoretical potential of less than about 1.23 V.

The methods and systems provided herein include alkaline water electrolysis employing a membrane, such as an anion exchange membrane (AEM) to separate the two electrode chambers, each of which uses alkaline electrolytes, such as but not limited to, NaOH or KOH. In some examples, the cathode electrolyte can be at a lower pH than the anode electrolyte, and the anode electrolyte can be a relatively high pH solution. In an example, both the anode electrolyte and the cathode electrolyte can be maintained at their respective pH via thermal means for water balance. The theoretical voltage for the entire water electrolysis reaction may be $1.23-0.059 \cdot \Delta pH$ volts, where $\Delta pH$ is the pH difference between the anolyte and catholyte. For example, an anolyte pH of 15 and catholyte pH of 11 would have a theoretical water electrolysis potential of about 0.994 V, or about 0.236 V less than the theoretical potential of 1.23 V.

In one aspect, a method to generate hydrogen gas comprises:
providing an anode and an anode electrolyte in an electrochemical cell wherein the anode electrolyte comprises a metal oxyanion with a metal ion in a lower oxidation state or a non-metal oxyanion with a non-metal ion in a lower oxidation state;
oxidizing the metal oxyanion with the metal ion in the lower oxidation state to a metal oxyanion with metal ion in a higher oxidation state or oxidizing the non-metal oxyanion with the non-metal ion in the lower oxidation state to a non-metal oxyanion with non-metal ion in a higher oxidation state at the anode;
providing a cathode and a cathode electrolyte in the electrochemical cell and forming hydrogen gas and hydroxide ions at the cathode;
separating the anode electrolyte from the cathode electrolyte by an anion exchange membrane (AEM);
migrating the hydroxide ions from the cathode electrolyte to the anode electrolyte through the AEM; and
maintaining a steady-state pH differential of greater than 1 between the anode electrolyte and the cathode electrolyte.

In some examples, the method further comprises operating the electrochemical cell at a theoretical voltage of less than about 1.23 V.

In one aspect, an electrochemical cell to generate hydrogen gas comprises:
an anode and an anode electrolyte comprising a metal oxyanion with a metal ion in a lower oxidation state or a non-metal oxyanion with a non-metal ion in a lower oxidation state wherein the anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state;
a cathode and a cathode electrolyte comprising water wherein the cathode is configured to reduce water to form hydroxide ions and hydrogen gas; and
an anion exchange membrane disposed between the anode electrolyte and the cathode electrolyte and configured to migrate the hydroxide ions from the cathode electrolyte to the anode electrolyte;
wherein the electrochemical cell is configured to maintain a steady-state pH differential of greater than 1 between the anode electrolyte and the cathode electrolyte.

In some examples, the electrochemical cell systems are configured to operate at a theoretical voltage of less than about 1.23 V.

In some examples, the pH of the cathode electrolyte is lower than the pH of the anode electrolyte. In some examples, the pH of the anode electrolyte is from about 10 to about 15 and the pH of the cathode electrolyte is from about 8 to about 13 In some examples, the pH of the anode electrolyte is from about 10 to about 15 and the pH of the cathode electrolyte is from about 8 to about 13 while maintaining the steady-state pH differential of greater than 1 between the anode electrolyte and the cathode electrolyte.

In some examples, the pH of the anode electrolyte is from about 10 to about 15, for example from about 10 to about 14, such as from about 10 to about 13, for example from about 10 to about 12, such as from about 10 to about 11, for example from about 11 to about 15, such as from about 11 to about 14, for example from about 11 to about 13, such as from about 11 to about 12, for example from about 12 to about 15, such as from about 12 to about 14, for example from about 12 to about 13, such as from about 13 to about 15, for example from about 13 to about 14, such as from about 14 to about 15.

In some examples, the pH of the cathode electrolyte is from about 8 to about 13, for example from about 8 to about 12, such as from about 8 to about 11, for example from about 8 to about 10, such as from about 8 to about 9, for example from about 9 to about 13, such as from about 9 to about 12, for example from about 9 to about 11, such as from about 9 to about 10, for example from about 10 to about 13, such as from about 10 to about 12, for example from about 10 to about 11, such as from about 11 to about 13, for example from about 11 to about 12, such as from about 12 to about 13.

In some examples, the pH of the anode electrolyte is from about 10 to about 15, for example from about 10 to about 14, such as from about 10 to about 13, for example from about 10 to about 12, such as from about 10 to about 11; and the pH of the cathode electrolyte is from about 8 to about 13, for example from about 8 to about 12, such as from about 8 to about 11, for example from about 8 to about 10, such as from about 8 to about 9. In some examples, the pH of the anode electrolyte is from about 10 to about 15, for example from about 10 to about 14, such as from about 10 to about 13, for example from about 10 to about 12, such as from about 10 to about 11; the pH of the cathode electrolyte is from about 8 to about 13, for example from about 8 to about 12, such as from about 8 to about 11, for example from about 8 to about 10, such as from about 8 to about 9; and the steady-state pH differential between the anode electrolyte and the cathode electrolyte is from about 1 to about 6, for example from about 1 to about 5, such as from about 1 to about 4, for example from about 1 to about 3, such as from about 1 to about 2.

In some examples, the pH of the anode electrolyte is from about 12 to about 15, for example from about 12 to about 14, such as from about 12 to about 13, for example from about 13 to about 15, such as from about 13 to about 14, for example from about 14 to about 15; and the pH of the cathode electrolyte is from about 11 to about 13, for example from about 11 to about 12, such as from about 12 to about 13.

In some examples, the steady-state pH differential between the anode electrolyte and the cathode electrolyte is greater than 1, for example from about 1 to about 7, such as from about 1 to about 6, for example from about 1 to about 5, such as from about 1 to about 4, for example from about 1 to about 3, such as from about 1 to about 2, for example from about 2 to about 7, such as from about 2 to about 6, for example from about 2 to about 5, such as from about 2 to about 4, for example from about 2 to about 3, such as from about 3 to about 7, for example from about 3 to about 6, such as from about 3 to about 5, for example from about 3 to about 4, such as from about 4 to about 7, for example from about 4 to about 6, such as from about 4 to about 5, for example from about 5 to about 7, such as from about 5 to about 6, for example from about 6 to about 7.

The pH of the cathode electrolyte and the anode electrolyte can be maintained via thermal means for water balance. In some examples, the water being added to the cathode chamber can be from an external feedstock and/or recirculated from the anode chamber. In some examples, a portion of the water may be removed thermally internally or externally from the anode chamber and transferred to the cathode chamber. Means for such transfer are well known in the art and include without limitation conduits, pipes, and/or tanks for the storage and/or transfer.

In some examples, the balance between the electrical conductivity of the cathode electrolyte and its pH is maintained such that the pH of the cathode electrolyte is lower than that of the anode electrolyte and that the cathode electrolyte has an electrical conductivity that does not adversely affect the cell voltage owing to a large resistance. In some examples, the methods and the systems provided herein further comprise a salt comprising a polyatomic anion in the cathode electrolyte. The term "polyatomic anion" as used herein when referring to this salt includes a covalently bonded set of two or more atoms that has a net charge that is not zero. Examples of the polyatomic anion in the salt include, but are not limited to, carbonate, citrate, oxalate, ethylene diamine tetraacetic acid (EDTA), malate, acetate, phosphate, sulfate, or combinations thereof. In some examples, the counter cation in the salt comprising the polyatomic anion is selected from the group consisting of lithium, sodium, potassium, and combinations thereof. It is to be understood that this "polyatomic anion in the salt" or "salt comprising polyatomic anion" in the cathode electrolyte is different from the "metal oxyanion" or "non-metal oxyanion" in the anode electrolyte or any other "salt" or "saltwater" in the electrolytes described herein.

In some examples, the aforementioned salt comprising a cation and the polyatomic anion is selected such that the salt is stable and soluble in alkaline (e.g., pH >7) conditions and possesses one or more properties, such as, but not limited to, not blocking the membrane transport mechanism, not migrating through the membrane, not reacting at the cathode, and/or not reacting with hydroxide, hydrogen, or oxygen. In some examples, the polyatomic anion is such that the anion is selectively rejected by the AEM so that only hydroxide ions are transported across the AEM from the cathode chamber to the anode chamber to maintain the pH differential. In some examples, the polyatomic anion may also be selected such that the anion is stable in a reducing environment so that water is reduced at the cathode instead of the polyatomic anion. In some examples, the corresponding cation in the salt are selected such that the cation does not diffuse through the membrane from the cathode chamber to the anode chamber and are not reduced at the cathode.

In some examples, concentration of the aforementioned salt comprising a polyatomic anion in the cathode electrolyte is from about 0.1 M to about 3 M, for example from about 0.1 M, to about 2.5 M, such as from about 0.1 M to about 2 M, for example from about 0.1 NI to about 1.5 M, such as from about 0.1 M to about 1 M, for example from about 0.1 M to about 0.5 M, such as from about 0.5 M to about 3 M, for example from about 0.5 M to about 2.5 M, such as from about 0.5 M to about 2 M, for example from about 0.5 M to about 1.5 M, such as from about 0.5 M to about 1 M, for example from about 1 M to about 3 M, such as from about 1 M to about 2.5 M, for example from about 1 M to about 2 M, such as from about 1 M to about 1.5 M, for example from about 1.5 M to about 3 M, such as from about 1.5 M to about 2.5 M, for example from about 1.5 M to about 2 M, such as from about 2 M to about 3 M, for example from about 2 M to about 2.5 M.

In some examples, the methods and systems have a theoretical voltage of less than 1.3 V, or less than 1.5 V, or less than 2 V, or less than 2.5 V of the electrochemical cell. In some examples, the methods and systems have an operating voltage of between 1.3 V to about 3 V, for example from 1.5 V to about 3 V, such as from 2 V to about 3 V, for example from 1 V to about 3 V, such as from 1.5 V to about 2.5 V of the electrochemical cell.

In some examples, the anode electrolyte and the cathode electrolyte are separated by a cation exchange membrane (CEM) that facilitates migration of cations from the anode electrolyte to the cathode electrolyte. The cation relates to a corresponding cation of the metal oxyanion or the non-metal oxyanion. In some examples, the corresponding cation for the metal oxyanion or the non-metal oxyanion is an alkali metal or an alkali earth metal. Examples of alkali metals include, but are not limited to, sodium, potassium, lithium, or cesium. Examples of alkali earth metals include, but are not limited to, calcium, strontium, magnesium, and barium. In some examples, the cation is sodium ion or potassium ion or lithium ion. The CEM prevents migration of the metal oxyanion or the non-metal oxyanion from the anode electrolyte to the cathode electrolyte while facilitating the migration of the cations.

Accordingly, in some examples, the methods and systems further comprise migrating the cations, e.g., the alkali metal ion or the alkali earth metal ion from the anode electrolyte to the cathode electrolyte and forming alkali metal hydroxide or alkali earth metal hydroxide, respectively, in the cathode electrolyte. This aspect is illustrated generally in FIG. 5. FIG. 6 shows an example using the manganate/permanganate combination as the oxyanion compound, as described above.

In one aspect, a method to generate hydrogen gas comprises:
  providing an anode and an anode electrolyte in an electrochemical cell wherein the anode electrolyte comprises a metal oxyanion with a metal ion in a lower oxidation state or a non-metal oxyanion with a non-metal ion in a lower oxidation state;
  oxidizing the metal oxyanion with the metal ion in the lower oxidation state to a metal oxyanion with metal ion in a higher oxidation state or the non-metal oxyanion with the non-metal ion in the lower oxidation state to a non-metal oxyanion with non-metal ion in a higher oxidation state at the anode;
  providing a cathode and a cathode electrolyte in the electrochemical cell and forming hydrogen gas at the cathode;
  providing a CEM between the anode electrolyte and the cathode electrolyte;
  transferring cations from the anode electrolyte to the cathode electrolyte; and
  transferring at least a portion of the anode electrolyte comprising the metal oxyanion with the metal ion in the higher oxidation state or the non-metal oxyanion with the non-metal ion in the higher oxidation state outside the electrochemical cell.

In some examples, the method further comprises subjecting the anode electrolyte comprising the metal oxyanion with the metal ion in the higher oxidation state or the anode electrolyte comprising the non-metal oxyanion with the non-metal ion in the higher oxidation state to a thermal reaction or a second electrochemical reaction to form oxygen gas and the metal oxyanion with the metal ion in the lower oxidation state or the non-metal oxyanion with the non-metal ion in the lower oxidation state, respectively. Both the thermal reaction and the second electrochemical reaction have been described herein.

In one aspect, a system to generate hydrogen gas comprises:
  an electrochemical cell comprising;
    an anode and an anode electrolyte comprising a metal oxyanion with a metal ion in a lower oxidation state or an anode electrolyte comprising a non-metal oxyanion with a non-metal ion in a lower oxidation state, wherein the anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state;
    a cathode and a cathode electrolyte comprising water wherein the cathode is configured to reduce water to form hydroxide ions and hydrogen gas; and
    a CEM disposed between the anode electrolyte and the cathode electrolyte, wherein the CEM is configured to transfer cations from the anode electrolyte to the cathode electrolyte.

In some examples, the system further comprises a thermal reactor operably, connected to the electrochemical cell, wherein the thermal reactor is configured to receive at least a portion of the anode electrolyte comprising the metal oxyanion with the metal ion in the higher oxidation state or the non-metal oxyanion with the non-metal ion in the higher oxidation state and subject the portion of the anode electrolyte to a thermal reaction to form oxygen gas and the metal oxyanion with the metal ion in the lower oxidation state or the non-metal oxyanion with the non-metal ion in the lower oxidation state, respectively.

In some examples, the system further comprises a second electrochemical cell operably connected to the electrochemical cell and configured to receive at least a portion of the anode electrolyte comprising the metal oxyanion with the metal ion in the higher oxidation state or the non-metal oxyanion with the non-metal ion in the higher oxidation state and form oxygen gas and the metal oxyanion with the metal ion in the lower oxidation state or the non-metal oxyanion with the non-metal ion in the lower oxidation state, respectively.

Both the thermal reactor and the second electrochemical cell have been described herein.

In some examples, the cation comprises an alkali metal ion or an alkali earth metal ion and methods and systems further comprise forming alkali metal hydroxide or alkali earth metal hydroxide in the cathode electrolyte.

Figure 5:
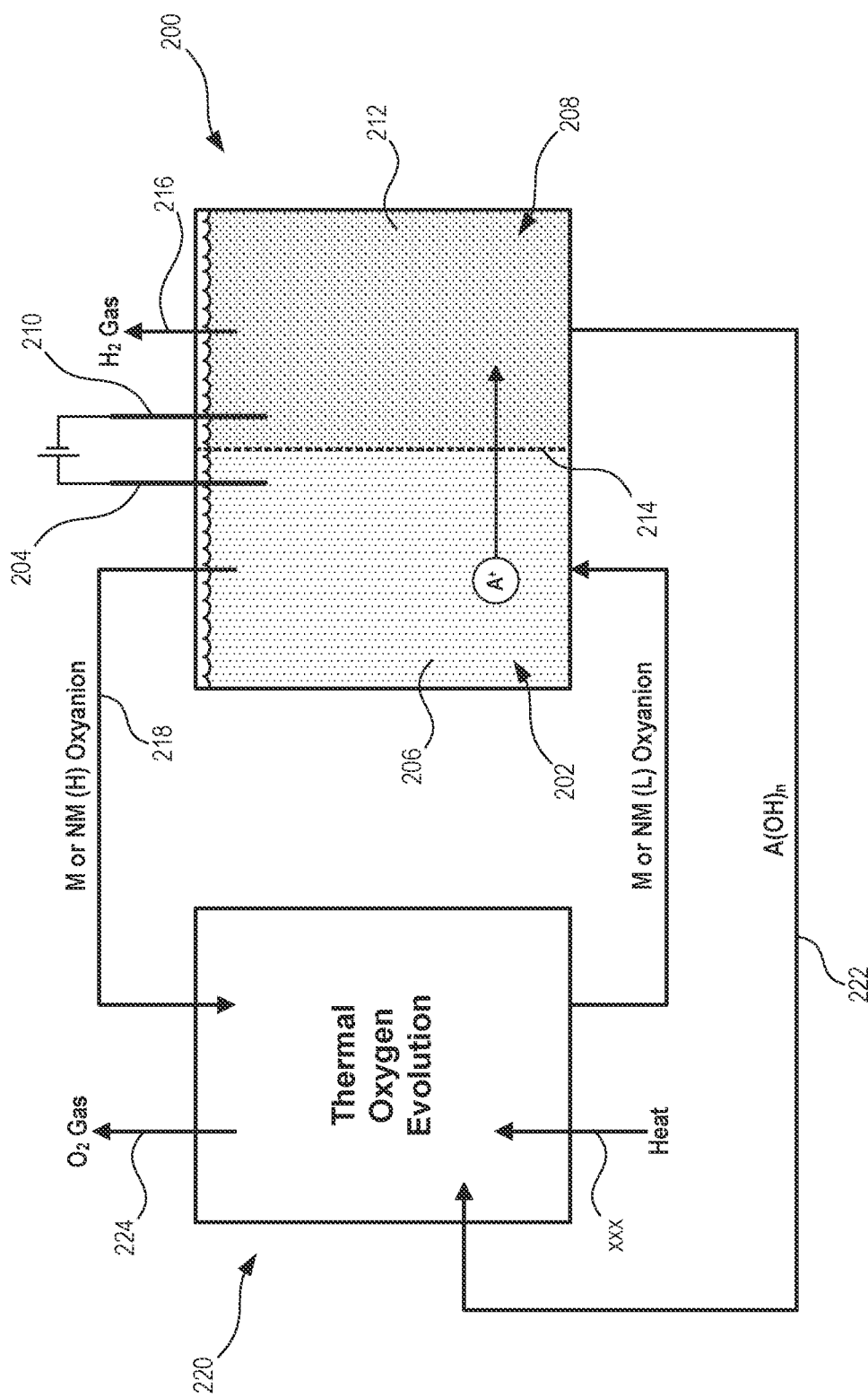
FIG. 5 is an illustration of an example system for the formation of hydrogen gas at a cathode; migration of cations from the anode electrolyte to the cathode electrolyte; oxidation of a metal oxyanion or a non-metal oxyanion at an anode; and thermal reaction of the oxidized metal oxyanion or the oxidized non-metal oxyanion to form oxygen gas.
Figure 6:
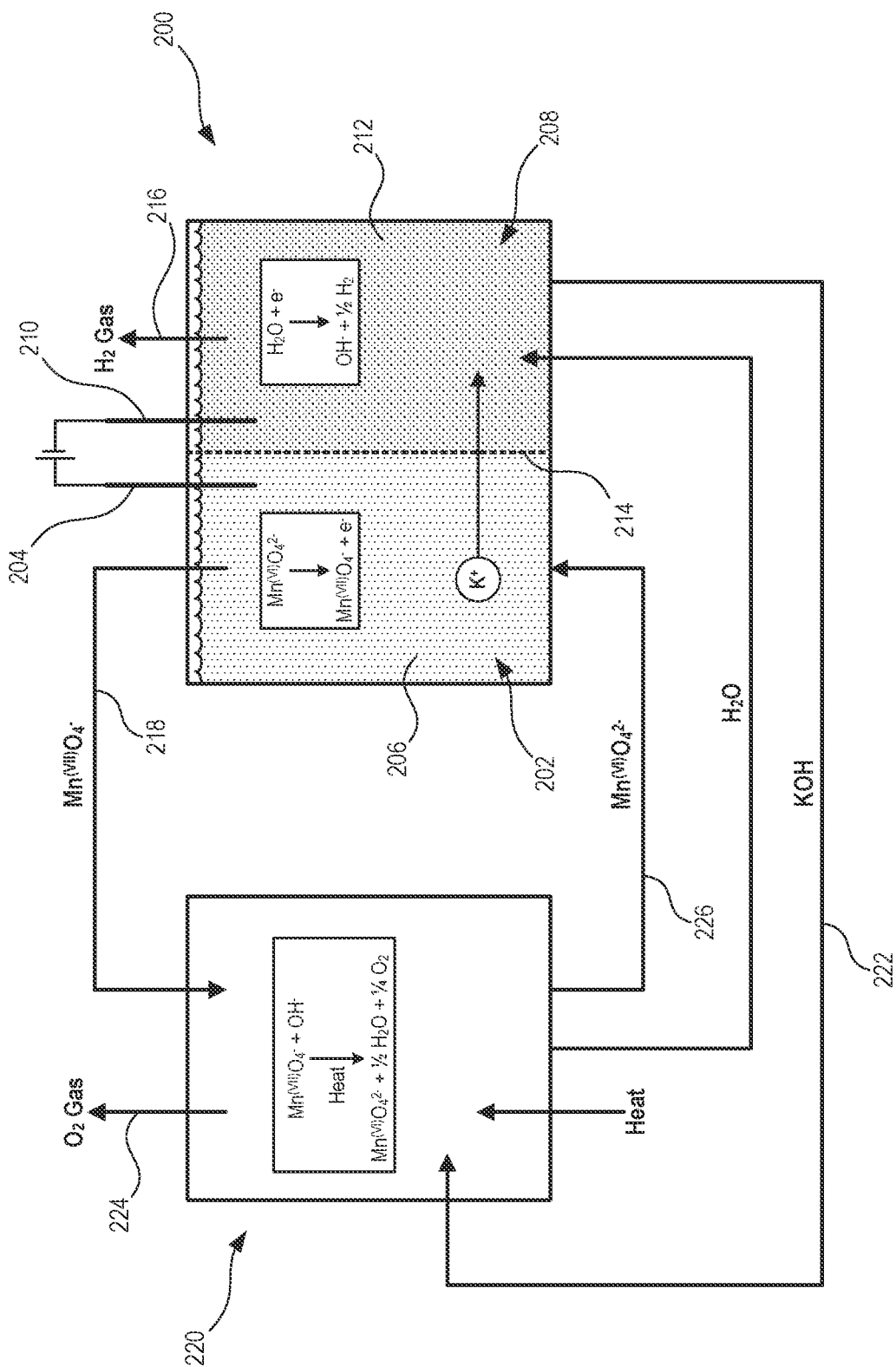
FIG. 6 is an illustration of an example system for the formation of hydrogen gas at a cathode; oxidation of a manganate ion to a permanganate ion at an anode; and migration of cations from the anode electrolyte to the cathode electrolyte.

As shown in FIG. 5, the example system can include an electrochemical cell 200 that comprises an anode chamber 202 containing an anode 204 and an anode electrolyte 206. The anode electrolyte 206 can comprise one or more oxyanion compounds in a lower oxidation state, such as a metal oxyanion with a metal ion in a lower oxidation state (M(L) oxyanion) or a non-metal oxyanion with a non-metal ion in a lower oxidation state (NM(L) oxyanion) and corresponding cations (illustrated generically in FIG. 5 as $A^+$, where A is any cation). The electrochemical cell 200 also includes a cathode chamber 208 containing a cathode 210 and a cathode electrolyte 212. A membrane 214, such as a cation exchange membrane (CEM), is positioned between the anode chamber 202 and the cathode chamber 208 to separate the anode electrolyte 206 from the cathode electrolyte 212. The electrochemical cell 200 can be any type of electrochemical cell that is configured to oxidize the metal oxyanion with the metal ion in the lower oxidation state (M(L) oxyanion) or the non-metal oxyanion with the non-metal ion in the lower oxidation state (NM(L) oxyanion), or both, at the anode 204. Specifically, the anode 204 oxidizes the metal ion of the metal oxyanion or the non-metal ion of the non-metal oxyanion from the lower oxidation state (M(L) oxyanion or NM(L) oxyanion) to the higher oxidation state (M(H) oxyanion or NM(H) oxyanion). The cathode 210 reduces water in the cathode chamber 208 to hydroxide ions and hydrogen gas 216. FIG. 6 shows a specific example of the use of the same system as in FIG. 5, wherein the one or more oxyanion compounds comprises a manganese metal oxyanion that is a manganate ion ($MnO_4^{2-}$) when in the lower oxidation state and is a permanganate ion ($MnO_4^-$) when in the higher oxidation state, and the corresponding cation is a potassium ion ($K^+$).

In some examples, a GEM is used for the membrane 214 rather than a PEM to separate the electrode chambers 202, 208 because a CEM can reduce, minimize, or eliminate the transport of the metal oxyanion or the non-metal oxyanion from the anode chamber 202 to the cathode chamber 208, which can reduce or minimizing contamination of the cathode electrolyte 212 and improve the efficiency of the process.

In some examples, the corresponding cation e.g. the alkali metal ion or the alkali earth metal ion (represented as A' in FIG. 5 or K in FIG. 6) of the metal oxyanion or the non-metal oxyanion is transferred or migrates through the CEM 214 from the anode electrolyte 206 into the cathode electrolyte 212 where it combines with a hydroxide ion to form $A(OH)_n$ (where n is any integer depending on the valency of A), e.g. alkali metal hydroxide (NaOH), or KOH, or LiOH, etc.) or alkali earth metal hydroxide ($Ca(OH)_2$, $Mg(OH)_2$, $Ba(OH)_2$, etc.) in the cathode electrolyte 212. At least a portion of the anode electrolyte 206 comprising the metal oxyanion with the metal ion in the higher oxidation state (M(H) oxyanion) or the non-metal oxyanion with the non-metal ion in the higher oxidation state (NM(H) oxyanion), or both, is transferred outside the electrochemical cell 200 as an anode electrolyte solution 218 so that it can be subjected to a thermal reaction, e.g., in a thermal reactor 220, or a second electrochemical reaction.

In some examples, a portion of the cathode electrolyte 212 comprising $A(OH)_n$ is withdrawn from the electrochemical cell 200 and the $A(OH)_n$ (not shown in the figures) is used or sold for commercial purposes.

In some examples, at least a portion of the cathode electrolyte 212 comprising $A(OH)_n$ is withdrawn from the cathode chamber 208 as a cathode electrolyte solution 222, which is transferred to the thermal reactor 220 or to a second electrochemical cell (not shown in FIG. 5 or 6, but similar to the second electrochemical reactor 170 shown in FIG. 4) where evolution of oxygen gas 224 takes place and the one or more oxyanion compounds in the higher oxidation state (e.g., the metal oxyanion with the metal ion in the higher oxidation state M(H) oxyanion) or the non-metal oxyanion with the non-metal ion in the higher oxidation state (NM(H) oxyanion), or both) is reduced to form one or more oxyanion compounds in a lower oxidation state (e.g., the metal oxyanion with the metal ion in the lower oxidation state (M(L) oxyanion) or the non-metal oxyanion with the non-metal ion in the lower oxidation state (NM(L) oxyanion, or both). A portion of the resulting electrolyte solution 226 that includes this metal oxyanion with the metal ion in the lower oxidation state (M(L) oxyanion) or the non-metal oxyanion with the non-metal ion in the lower oxidation state (NM(L) oxyanion) can be transferred back to the anode chamber 202 of the electrochemical cell 200 and mixed with the anode electrolyte 206 already present there. The solution 218 that provides for the transfer of the metal oxyanion or the non-metal oxyanion from the anode chamber 202 to the thermal reactor 220 or to the second electrochemical cell may be in solid form or in liquid solution form. In some examples, the metal oxyanion or the non-metal oxyanion can be partially or fully insoluble in the anode electrolyte 206. In such examples, the metal oxyanion or the non-metal oxyanion may or may not be separated from the anode electrolyte 206. Various known techniques can be used for the separation including, but not limited to, techniques for liquid-solid separation, e.g. filtration.

As described above, the oxidation of the metal oxyanion or the non-metal oxyanion at the anode 204 is at a voltage low enough to not evolve gas (e.g., oxygen or chlorine gas) or to evolve a minimal amount of oxygen gas to reduce or minimize efficiency losses in the cell 200. In such examples, the cell 200 can operate at below about 25% Faradaic efficiency to oxygen (i.e., as low as about 75% of current may be for the metal or the non-metal oxyanion oxidation and up to only about 25% such as e.g., up to only about 15% or 10% or 5% or 1% may be for the oxygen evolution).

In some examples, the electrochemical cell 200 oxidizing the metal oxyanion or the non-metal oxyanion at the anode 204, can also be operated in such a way to form oxygen gas at the anode 204 simultaneously, or sequentially, or solely, depending on the applied current and the voltage in the cell. In such examples, the cell 200 may operate at below about 95% Faradaic efficiency to oxygen (i.e., up to about 95% may be for the oxygen evolution).

Typically, electrochemical systems are designed to prevent a secondary reaction at each electrode, to reduce or minimize efficiency losses in making an undesirable product. Applicants surprisingly and unexpectedly found that it is economically advantageous to have an electrochemical system with the flexibility to run at variable power to form different products at the anode 204 to align with variable electrical power availability/prices and form the hydrogen gas 216 at the cathode 210 with lower cost. For example, the oxidation of the metal oxyanion or the non-metal oxyanion at the anode 204 may be predominant at low current and voltage with minimal or no oxygen gas formed at the anode 204, while the oxidation of hydroxide ions to oxygen gas may be predominant at high current and high voltage with minimal or no metal or non-metal oxyanion oxidation. The cell 200 can be operated at low current during peak electricity prices (such as e.g., day time) or load shedding to oxidize the metal or the non-metal oxyanion at the anode 204 and the same cell 200 can be operated at high current or load gaining during low electricity prices (such as e.g., night time or day time when the power comes from a solar plant) to form the oxygen gas at the anode 204.

Figure 7:
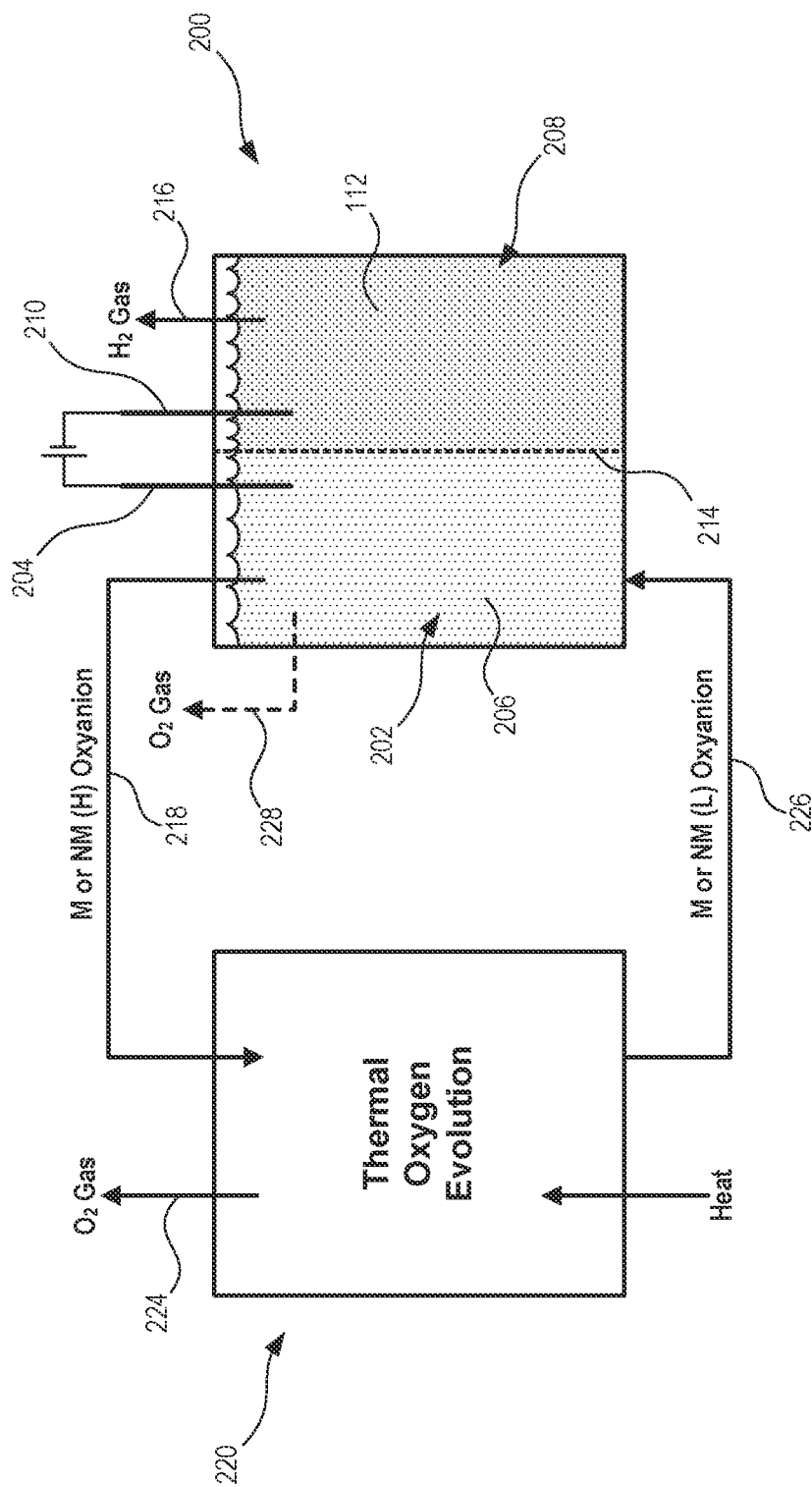
FIG. 7 is an illustration of an example system for the formation of hydrogen gas at a cathode; oxidation of a metal oxyanion or a non-metal oxyanion at an anode; formation of oxygen gas at the anode; and a thermal reaction and/or a second electrochemical reaction of the oxidized metal oxyanion or the oxidized non-metal oxyanion at the anode to form oxygen gas.

In some examples, select oxidation of the metal oxyanion or the non-metal oxyanion oxidation occurs at a lower voltage at the anode 204 than oxygen evolution, increasing the efficiency of hydrogen production (i.e. lower overall voltage) at the cathode 216. Applicants surprisingly found that in some examples the oxidation of the one or more oxyanion compounds may not be sustained at higher current due to mass transfer limitations, such that the reactive species may not be replenished at the anode 204 quick enough. The voltage of the system may increase in order to sustain the desired current and may oxidize the next energetically lowest reactant, such as hydroxide ions to oxygen gas. Therefore, in some examples the metal or the non-metal oxyanion can be oxidized and oxygen gas 228 evolved from the anode 204 simultaneously (as illustrated in FIG. 7 with oxygen evolution at the anode 204 shown in dashed arrow) or sequentially, or solely by controlling the current and the voltage. This aspect of the methods and systems provides an advantage to generate hydrogen gas 216 at a lower voltage overall and to have the ability to increase hydrogen production when conditions are favorable (such as low electricity prices) by both oxidizing the metal or the non-metal oxyanion and evolving the oxygen gas 228.

Accordingly, in one aspect, a method to generate hydrogen gas comprises:

providing an anode and an anode electrolyte comprising a metal oxyanion with a metal ion in a lower oxidation state or a non-metal oxyanion with a non-metal ion in a lower oxidation state in an electrochemical cell;

oxidizing the metal oxyanion with the metal ion in the lower oxidation state to a metal oxyanion with metal ion in a higher oxidation state or the non-metal oxyanion with the non-metal ion in the lower oxidation state to a non-metal oxyanion with non-metal ion in a higher oxidation state at the anode; and oxidizing hydroxide ions at the anode to form oxygen gas; and providing a cathode and a cathode electrolyte in the electrochemical cell and forming hydrogen gas at the cathode.

In some examples, at least a portion of the anode electrolyte comprising the metal oxyanion with the metal ion in the higher oxidation state or the non-metal oxyanion with the non-metal ion in the higher oxidation state, or both, is transferred outside the electrochemical cell and is either reduced thermally (e.g., in a thermal reactor 220) and/or electrochemically (e.g., in a second electrochemical cell) to form oxygen gas and to reduce the metal oxyanion or the non-metal oxyanion to its lower oxidation state. Both the thermal reaction as well as the electrochemical reaction to form oxygen gas have been described herein (and as illustrated in figures). In some examples, the cathode forms hydroxide ions and the hydroxide ions transfer or migrate from the cathode electrolyte to the anode electrolyte.

In one aspect, a system to generate hydrogen gas comprises:
    an electrochemical cell comprising;
        an anode and an anode electrolyte comprising a metal oxyanion with a metal ion in a lower oxidation state or a non-metal oxyanion with a non-metal ion in a lower oxidation state, wherein the anode is configured to oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state and/or oxidize hydroxide ions to oxygen gas; and
        a cathode and a cathode electrolyte comprising water wherein the cathode is configured to reduce water to form hydroxide ions and hydrogen gas.

In some examples, the system further comprises a thermal reactor operably connected to the electrochemical cell, wherein the thermal reactor is configured to receive at least a portion of the anode electrolyte comprising the metal oxyanion with the metal ion in the higher oxidation state or the non-metal oxyanion with the non-metal ion in the higher oxidation state, or both, and subject the portion of the anode electrolyte to a thermal reaction in the thermal reactor to form oxygen gas and to reduce the metal oxyanion with the metal ion in the lower oxidation state or the non-metal oxyanion with the non-metal ion in the lower oxidation state, or both. In some examples, the electrochemical cell is further connected to a second electrochemical cell, as described herein.

In some examples, the oxidation of the metal oxyanion or the oxidation of the non-metal oxyanion is at a lower current density and the oxidation of hydroxide ions to oxygen gas is at a higher current density.

In one aspect, a method to generate hydrogen gas comprises:
    providing an anode and an anode electrolyte comprising a metal oxyanion with a metal ion in a lower oxidation state or a non-metal oxyanion with a non-metal ion in a lower oxidation state in an electrochemical cell;
    oxidizing the metal oxyanion with the metal ion in the lower oxidation state to a metal oxyanion with metal ion in a higher oxidation state or the non-metal oxyanion with the non-metal ion in the lower oxidation state to a non-metal oxyanion with non-metal ion in a higher oxidation state at the anode at current density of from about 1 mA/cm$^2$ to about 1000 mA/cm$^2$, for example from about 1 mA/cm$^2$ to about 600 mA/cm$^2$, such as from about 1 mA/cm$^2$ to about 500 mA/cm$^2$, for example from about 1 mA/cm$^2$ to about 300 mA/cm$^2$;
    oxidizing hydroxide ions at the anode to form oxygen gas at current density of from about 300 mA/cm$^2$ to about 3000 mA/cm$^2$, for example from about 300 mA/cm$^2$ to about 2000 mA/cm$^2$, such as from about 300 mA/cm$^2$ to about 1000 mA/cm$^2$, for example from about 300 mA/cm$^2$ to about 500 mA/cm$^2$; and
    providing a cathode and a cathode electrolyte in the electrochemical cell and forming hydrogen gas at the cathode.

In one aspect, there is provided a system to generate hydrogen gas, the system comprising:
    an electrochemical cell comprising;
        an anode and an anode electrolyte comprising a metal oxyanion with a metal ion in a lower oxidation state or a non-metal oxyanion with a non-metal ion in a lower oxidation state wherein the anode is configured to:
            oxidize the metal oxyanion with the metal ion in the lower oxidation state to a metal oxyanion with metal ion in a higher oxidation state or to oxidize the non-metal oxyanion with the non-metal ion in the lower oxidation state to a non-metal oxyanion with non-metal ion in a higher oxidation state at current density of from about 1 mA/cm$^2$ to about 1000 mA/cm$^2$, for example from about 1 mA/cm$^2$ to about 600 mA/cm$^2$, such as from about 1 mA/cm$^2$ to about 500 mA/cm$^2$, for example from about 1-300 mA/cm$^2$; and/or
            oxidize hydroxide ions to oxygen gas at current density of from about 300 mA/cm$^2$ to about 3000 mA/cm$^2$, for example from about 300 mA/cm$^2$ to about 2000 mA/cm$^2$, such as from about 300 mA/cm$^2$ to about 1000 mA/cm$^2$, for example from about 300 mA/cm$^2$ to about 500 mA/cm$^2$; and
        a cathode and a cathode electrolyte comprising water wherein the cathode is configured to reduce water to form hydroxide ions and hydrogen gas.

In some examples, the oxidation of the hydroxide ions at the anode to form the oxygen gas occurs simultaneously or sequentially, or alone with respect to the oxidation of the metal or the non-metal oxyanion.

In some examples, the cell operates at below about 25% of Faradaic efficiency to oxygen, for example from about 0.1% to about 25% of Faradaic efficiency to oxygen during the oxidation of the metal or the non-metal oxyanion and the cell operates at below about 95% of Faradaic efficiency to oxygen; for example from about 1% to about 95% or between about 25% to about 95% Faradaic efficiency to oxygen during the oxidation of the hydroxide ions to form the oxygen gas.

In some examples, the cell operates at low current or high electricity prices or daytime during the oxidation of the metal or the non-metal oxyanion and the cell operates at high current or low electricity prices or nighttime during the oxidation of the hydroxide ions to form the oxygen gas.

In some examples, the anode electrolyte and/or the cathode electrolyte further comprise water.

In some examples, the anode electrolyte and/or the cathode electrolyte further comprise salt water. In some examples, the anode electrolyte and/or the cathode electrolyte further comprise salt water when the anode electrolyte comprises the metal oxyanion or the non-metal oxyanion. In some examples, the anode electrolyte and/or the cathode electrolyte further comprise salt water when the anode electrolyte comprises the non-metal oxyanion. The terms "salt" or "salt water," as used herein, includes its conventional sense to refer to a number of different types of salts including, but not limited to, an alkali metal halide including, but not limited to, sodium halide, potassium halide, lithium halide, cesium halide, etc.; an alkali earth metal halide including, but not limited to, calcium halide, strontium halide, magnesium halide, barium halide, etc.; ammonium halide; or a lanthanide halide. The term "halide," as used herein, relates to halogens or halide atoms such as fluoride, bromide, chloride, or iodide. In some examples, the salt comprises alkali metal halide and/or alkali earth metal halide.

In some examples, the aforementioned salt may be present in the thermal reaction and may facilitate the evolution of the oxygen gas. This salt in the anode electrolyte solution may get re-circulated with the metal oxyanion or the non-metal oxyanion solution from the thermal reaction to the anode electrolyte in the electrochemical cell. Therefore, the salt may be present in both the anode electrolyte as well as in the thermal reaction.

The term "lanthanide halide," as used herein (used as a "salt"), includes a halide of an element from the lanthanide series. The element or the lanthanide from the lanthanide series can be selected from the group consisting of lanthanum, cerium, praseodymium, neodymium, promethium, samarium, europium, gadolinium, terbium, dysprosium, holmium, erbium, thulium, ytterbium, lutetium, and combinations thereof. Chemically similar elements such as scandium and yttrium, often collectively known as the rare earth elements, are also included in the term "lanthanide halide," as used herein. In some examples, the lanthanide halide is cerium halide e.g., cerium chloride or cerium bromide or cerium iodide. The lanthanide halide as used herein may be one lanthanide halide or may be a combination of two or more lanthanide halides, wherein the lanthanide in the one or more lanthanide halides is as noted above. The lanthanide halide can be in anhydrous form or in the form of a hydrate.

The salt may be from about 1 wt % to about 30 wt % of the anode electrolyte and/or the cathode electrolyte in the electrochemical cell or the electrolyte solution in the thermal reactor, for example from about 1 wt % to about 20 wt % of the electrolyte, such as from about 0.1 wt % to about 5 wt % of the electrolyte, for example from about 1 wt % to about 5 wt % of the electrolyte, such as from about 2 wt % to about 5 wt % of the electrolyte, for example from about 3 wt % to about 5 wt % of the electrolyte, such as from about 5 wt % to about 10 wt % of the electrolyte, for example from about 5 wt % to about 8 wt % of the electrolyte, such as from about 2 wt % to about 6 wt % of the electrolyte, for example from about 1 wt % to about 3 wt % of the electrolyte.

In some examples, the anode electrolyte comprising the metal oxyanion or the non-metal oxyanion further comprises salt (for example sodium chloride, or potassium chloride, or lithium chloride, or calcium chloride, or sodium bromide, or potassium bromide, or lithium bromide, or calcium bromide or lanthanide halide or respective iodide salts, or combinations thereof) and includes from about 1 wt % to about 30 wt % salt, for example from about 1 wt % to about 25 wt % salt, such as from about 1 wt % to about 20 wt % salt, for example from about 1 wt % to about 10 wt % salt, such as from about 1 wt % to about 5 wt % salt, for example from about 5 wt % to about 30 wt % salt, such as from about 5 wt % to about 20 wt % salt, for example from about 5 wt % to about 10 wt % salt, such as from about 8 wt % to about 30 wt % salt, for example from about 8 wt % to about 25 wt % salt, such as from about 8 wt iii to about 20 wt % salt, for example from about 8 wt % to about 15 wt % salt, such as from about 10 wt % to about 30 wt % salt, for example from about 10 wt % to about 25 wt % salt, such as from about 10 wt % to about 20 wt % salt, for example from about 10 wt % to about 15 wt % salt, such as from about 15 wt % to about 30 wt % salt, for example from about 15 wt % to about 25 wt % salt, such as from about 15 wt % to about 20 wt % salt, for example from about 20 wt % to about 30 wt % salt, such as from about 20 wt % to about 25 wt % salt. The salt in water would form saltwater as described herein.

In some examples of the methods and systems provided herein, the water in the anode electrolyte and/or the cathode electrolyte may be from about 10 wt % to about 80 wt %, for example from about 20 wt % to about 80 wt iii, such as from about 40 wt % to about 80 wt %, for example from about 40 wt % to about 70 wt %, such as from about 40 wt % to about 60 wt %, for example from about 40 wt % to about 50 wt %, such as from about 50 wt % to about 80 wt %, for example from about 50 wt % to about 70 wt %, such as from about 50 wt % to about 60 wt %, for example from about 60 wt % to about 80 wt %, such as from about 60 wt % to about 70 wt %, for example from about 70 wt % to about 80 wt %, such as from about 60 wt % to about 85 wt %, for example from about 60 wt % to about 75 wt %, such as from about 60 wt % to about 65 wt %, for example from about 70 wt % to about 75 wt %, such as from about 75 wt % to about 80 wt %, depending on the amount of the metal oxyanion or the non-metal oxyanion and, optionally, the salt.

In some examples, the anode electrolyte further comprises an alkali metal hydroxide or an alkali earth metal hydroxide. Examples of the alkali metal and the alkali earth metal have been provided herein. In some examples, the anode electrolyte comprises potassium hydroxide or sodium hydroxide. In some examples, the anode electrolyte comprises an alkali metal hydroxide, e.g. KOH or NaOH, or an alkali earth metal hydroxide, e.g. $Ca(OH)_2$ or $Mg(OH)_2$, in an amount of from about 1 M to about 6 M, for example from about 1 M to about 5 M, such as from about 1 M to about 4 M, for example from about 1 M, to about 3 M, such as from about 1 M to about 2 M, for example from about 2 M to about 7 M, such as from about 3 M to about 6 M, for example from about 4 M to about 6 M.

The terms "metal ion" or "metal" or "metal ion of the metal oxyanion," as used herein, includes any metal ion capable of being converted from a lower oxidation state to a higher oxidation state. Examples of the metal ion in the corresponding metal oxyanion include, but are not limited to, manganese, iron, chromium, selenium, copper, tin, silver, cobalt, uranium, lead, mercury, vanadium, bismuth, titanium, ruthenium, osmium, europium, zinc, cadmium, gold, nickel, palladium, platinum, rhodium, iridium, technetium, rhenium, molybdenum, tungsten, niobium, tantalum, zirconium, hafnium, and combination thereof. In some examples, the metal ion in the corresponding metal oxyanion includes, but are not limited to, iron, copper, tin, chromium, manganese, selenium, tantalum, or combination thereof. In some examples, the metal ion in the corresponding metal oxyanion is copper. In some examples, the metal ion in the corresponding metal oxyanion is tin. In some examples, the metal ion in the corresponding metal oxyanion is iron. In some examples, the metal ion in the corresponding metal oxyanion is chromium. In some examples, the metal ion in the corresponding metal oxyanion is manganese. In some examples, the metal ion in the corresponding metal oxyanion is selenium. In some examples, the metal ion in the corresponding metal oxyanion is tantalum. In some examples, the metal ion in the corresponding metal oxyanion is platinum.

The term "oxidation state," as used herein when referring to the metal ion in the metal oxyanion, includes the degree of oxidation of the metal ion in the metal oxyanion. In some examples, the oxidation state is the net charge on the metal ion. As used herein, the term "lower oxidation state" refers to the relative oxidation state when compared to the "higher oxidation state," i.e., with a lower oxidation number when compared to that of the same metal ion when in the higher oxidation state. The "lower oxidation state" may be represented as Metal (L) or M(L) illustrating the lower oxidation state of the metal ion. For example, the lower oxidation state of the metal ion may be 1+, 2+, 3+, 4+, 5+, or 6+. Similarly, as used herein, the term "higher oxidation state" refers to the relative oxidation state when compared to the "lower oxidation state," i.e., with a higher oxidation number when compared to that of the same metal ion when in the lower oxidation state. The "higher oxidation state" may be represented as Metal or M(H) illustrating the higher oxidation state of the metal ion. For example, the higher oxidation state of the metal ion may be 2+, 3+, 4+, 5+, 6+, 7+.

In some examples, the metal oxyanion with the metal ion in the lower oxidation state is selected from the group consisting of $MnO_4^{2-}$, $FeO_4^{2-}$, $RuO_4^{2-}$, $OsO_4^{2-}$, $HSnO_2^-$, $SeO_3^{2-}$, $Cu_2O$, $CrO_3^{3-}$, and $TeO_3^{2-}$.

In some examples, the metal oxyanion with the metal ion in the higher oxidation state is selected from the group consisting of $MnO_4^-$, $RuO_4^-$, $OsO_5^{2-}$, $SnO_3^{2-}$, $SeO_4^{2-}$, $CuO_2^{2-}$, $CrO_4^{2-}$, and $TeO_4^{2-}$.

In some examples,
the metal oxyanion with the metal ion in the lower oxidation state is $MnO_4^{2-}$ and the metal oxyanion with the metal ion in the higher oxidation state is $MnO_4^-$;
the metal oxyanion with the metal ion in the lower oxidation state is $FeO_4^{2-}$ and the metal oxyanion with the metal ion in the higher oxidation state is $HFeO_2^-$;
the metal oxyanion with the metal ion in the lower oxidation state is $RuO_4^{2-}$ and the metal oxyanion with the metal ion in the higher oxidation state is $RuO_4^-$;
the metal oxyanion with the metal ion in the lower oxidation state is $OsO_4^{2-}$ and the metal oxyanion with the metal ion in the higher oxidation state is $OsO_5^{2-}$;
the metal oxyanion with the metal ion in the lower oxidation state is $HSnO_2^-$ and the metal oxyanion with the metal ion in the higher oxidation state is $SnO_3^{2-}$;
the metal oxyanion with the metal ion in the lower oxidation state is $SeO_3^{2-}$ and the metal oxyanion with the metal ion in the higher oxidation state is $SeO_4^{2-}$;
the metal oxyanion with the metal ion in the lower oxidation state is $Cu_2O$ and the metal oxyanion with the metal ion in the higher oxidation state is $CuO_2^{2-}$;
the metal oxyanion with the metal ion in the lower oxidation state is $CrO_3^{3-}$ and the metal oxyanion with the metal ion in the higher oxidation state is $CrO_4^{2-}$; or
the metal oxyanion with the metal ion in the lower oxidation state is $TeO_3^{2-}$ and the metal oxyanion with the metal ion in the higher oxidation state is $TeO_4^{2-}$.

Two illustrative examples of the oxidation of a metal ion at the anode in the presence of hydroxide ions are shown below:

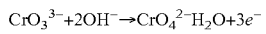

The terms "non-metal ion" or "non-metal" or "non-metal ion of the non-metal oxyanion," as used herein, includes any non-metal ion capable of being converted from a lower oxidation state to a higher oxidation state. Examples of the non-metal ion in the corresponding non-metal oxyanion include, but are not limited to, a halogen, carbon, sulfur, nitrogen, and phosphorus. The halogen is selected from chloro, fluoro, bromo, or iodo atoms.

The term "oxidation state," as used herein when referring to the non-metal ion in the non-metal oxyanion, includes the degree of oxidation of the non-metal ion in the non-metal oxyanion. In some examples, the oxidation state of the non-metal ion may be calculated assuming each oxygen is minus two and the non-metal center is the balance to get the overall charge. As used herein, the term "lower oxidation state" refers to the relative oxidation state when compared to the "higher oxidation state," i.e., with a lower oxidation number when compared to that of the same non-metal ion when in the higher oxidation state. The "lower oxidation state" may be represented as Non-Metal (L) or NM(L) illustrating the lower oxidation state of the non-metal ion. For example, the lower oxidation state of the non-metal ion may be 1+, 2+, 3+, 4+, 5+, or 6+. As used herein, the term "higher oxidation state" refers to the relative oxidation state when compared to the "lower oxidation state," i.e., with a higher oxidation number when compared to that of the same non-metal ion when in the lower oxidation state. The "higher oxidation state" may be represented as Non-Metal or NM(H) illustrating the higher oxidation state of the non-metal ion. For example, the higher oxidation state of the non-metal ion may be 2+, 3+, 4+, 5+, 6+, 7+.

In some examples, the non-metal oxyanion with the non-metal ion in the lower oxidation state comprises $NO_2^-$, $PO_3^{3-}$, $SO_3^{2-}$, $ClO^-$, $ClO_2^-$, $ClO_3^-$, $BrO^-$, $BrO_2^-$, $BrO_3^-$, $IO^-$, $IO_2^-$, and $IO_3^-$.

In some examples, the non-metal oxyanion with the non-metal ion in the higher oxidation state comprises $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, and $IO_4^-$.

In some examples,
the non-metal oxyanion with the non-metal ion in the lower oxidation state is $NO_2^-$ and the non-metal oxyanion with the non-metal ion in the higher oxidation state is $NO_3^-$;
the non-metal oxyanion with the non-metal ion in the lower oxidation state is $PO_3^{3-}$ and the non-metal oxyanion with the non-metal ion in the higher oxidation state is $PO_4^{3-}$;
the non-metal oxyanion with the non-metal ion in the lower oxidation state is $SO_3^{2-}$ and the non-metal oxyanion with the non-metal ion in the higher oxidation state is $SO_4^{2-}$;
the non-metal oxyanion with the non-metal ion in the lower oxidation state is $ClO^-$ and the non-metal oxyanion with the non-metal ion in the higher oxidation state is $ClO_2^-$;
the non-metal oxyanion with the non-metal ion in the lower oxidation state is $ClO_2^-$ and the non-metal oxyanion with the non-metal ion in the higher oxidation state is $ClO_3^-$;

the non-metal oxyanion with the non-metal ion in the lower oxidation state is $ClO_3^-$ and the non-metal oxyanion with the non-metal ion in the higher oxidation state is $ClO_4^-$;

the non-metal oxyanion with the non-metal ion in the lower oxidation state is $BrO^-$ and the non-metal oxyanion with the non-metal ion in the higher oxidation state is $BrO_2^-$;

the non-metal oxyanion with the non-metal ion in the lower oxidation state is $BrO_2^-$ and the non-metal oxyanion with the non-metal ion in the higher oxidation state is $BrO_3^-$;

the non-metal oxyanion with the non-metal ion in the lower oxidation state is $BrO_3^-$ and the non-metal oxyanion with the non-metal ion in the higher oxidation state is $BrO_4^-$;

the non-metal oxyanion with the non-metal ion in the lower oxidation state is $IO^-$ and the non-metal oxyanion with the non-metal ion in the higher oxidation state is $IO_2^-$;

the non-metal oxyanion with the non-metal ion in the lower oxidation state is $IO_2^-$ and the non-metal oxyanion with the non-metal ion in the higher oxidation state is $IO_3^-$; or the non-metal oxyanion with the non-metal ion in the lower oxidation state is $IO_3^-$ and the non-metal oxyanion with the non-metal ion in the higher oxidation state is $IO_4^-$.

Some illustrative examples of the oxidation states of the non-metal oxyanion and their oxidation to higher oxidation states are as shown in Table 1 below:

TABLE 1

| Oxidation State | +7 | +6 | +5 | +4 | +3 | +1 |
|---|---|---|---|---|---|---|
| | | | $NO_3^-$ | | $NO_2^-$ | |
| | | | $PO_4^{3-}$ | | $PO_3^{3-}$ | |
| | | $SO_4^{2-}$ | | $SO_3^{2-}$ | | |
| | $ClO_4^-$ | | $ClO_3^-$ | | $ClO_2^-$ | $ClO^-$ |
| | $BrO_4^-$ | | $BrO_3^-$ | | $BrO_2^-$ | $BrO^-$ |
| | $IO_4^-$ | | $IO_3^-$ | | $IO_2^-$ | $IO^-$ |

It is to be understood that any of the non-metal oxyanion with the non-metal ion in the lower oxidation state can oxidize to its corresponding non-metal oxyanion with the non-metal ion in the higher oxidation state. For example, $ClO^-$ can oxidize to $ClO_2^-$, or $ClO^-$ can oxidize to $ClO_3^-$, or $ClO^-$ can oxidize to $ClO_4^-$, or $ClO_2^-$ can oxidize to $ClO_3^-$, or $ClO_2^-$ can oxidize to $ClO_4^-$, or $ClO_3^-$ can oxidize to $ClO_4^-$, or any combination thereof. In some examples, there may be a combination of one or more of the aforementioned chlorooxyanion oxidation species in the anode electrolyte.

Similarly, $BrO^-$ can oxidize to $BrO_2^-$, or $BrO^-$ can oxidize to $BrO_3^-$, or $BrO^-$ can oxidize to $BrO_4^-$, or $BrO_2^-$ can oxidize to $BrO_3^-$, or $BrO_2^-$ can oxidize to $BrO_4^-$, or $BrO_3^-$ can oxidize to $BrO_4^-$, or any combination thereof. In some examples, there may be a combination of one or more of the aforementioned bromooxyanion oxidation species in the anode electrolyte.

Similarly, $IO^-$ can oxidize to $IO_2^-$, or $IO^-$ can oxidize to $IO_3^-$, or $IO^-$ can oxidize to $IO_4^-$, or $IO_2^-$ can oxidize to $IO_3^-$, or $IO_2^-$ can oxidize to $IO_4^-$, or $IO_3^-$ can oxidize to $IO_4^-$, or any combination thereof. In some examples, there may be a combination of one or more of the aforementioned iodooxyanion oxidation species in the anode electrolyte.

In some examples, the metal ion or the non-metal ion of the metal oxyanion or the non-metal oxyanion described herein, may be chosen based on the solubility of the metal oxyanion or the non-metal oxyanion in the anode electrolyte and/or cell voltages desired for the metal or the non-metal oxidation from the lower oxidation state to the higher oxidation state.

It is to be understood that the metal oxyanion with the metal ion in the lower oxidation state and the metal oxyanion with the metal ion in the higher oxidation state may be both present in the anode electrolyte entering and/or exiting the anode chamber depending on the oxidation. Similarly, it is to be understood that the non-metal oxyanion with the non-metal ion in the lower oxidation state and the non-metal oxyanion with the non-metal ion in the higher oxidation state may be both present in the anode electrolyte entering and/or exiting the anode chamber depending on the oxidation.

Owing to the oxidation of the metal oxyanion or the non-metal oxyanion from the lower oxidation state to the higher oxidation state at the anode, the amount of the metal oxyanion or the non-metal oxyanion in the lower oxidation state is different in the anode electrolyte entering the anode chamber and exiting the anode chamber.

In some examples, the concentration of the metal oxyanion or the non-metal oxyanion with the metal ion or the non-metal ion in the lower oxidation state entering the anode chamber is more than about 0.01 M; for example more than about 0.05 M, such as from about 0.01 M to about 2 M, for example from about 0.01 M to about 1.8 M, such as from about 0.01 M to about 1.5 M for example from about 0.01 M, to about 1.2 M; or between 0.01 M to about 1 M, for example from about 0.01 M to about 0.8 M, such as from about 0.01 M to about 0.6 M for example from about 0.01 M to about 0.5 M; or between 0.01 M to about 0.4 M, for example from about 0.01 M to about 0.1 M, such as from about 0.01 M to about 0.05 M, for example from about 0.05 M to about 2 M, such as from about 0.05 M to about 1.8 M, for example from about 0.05 M to about 1.5 M, such as from about 0.05 M to about 1.2 M, for example from about 0.05 M to about 1 M, such as from about 0.05 M to about 0.8 M, for example from about 0.05 M to about 0.6 M, such as from about 0.05 M to about 0.5 M, for example from about 0.05 M to about 0.4 M, such as from about 0.05 M, to about 0.1 M, for example from about 0.1 M to about 2 M, such as from about 0.1 M, to about 1.8 M, for example from about 0.1 M to about 1.5 M, such as from about 0.1 M to about 1.2 M, for example from about 0.1 M to about 1 M, such as from about 0.1 M to about 0.8 M, for example from about 0.1 M to about 0.6 M, for example from 0.1 M to about 0.5 M, such as from about 0.1 M to about 0.4 M, for example from about 0.5 M to about 2 M, such as from about 0.5 M to about 1.8 M, for example from about 0.5 M to about 1.5 M, such as from about 0.5 M to about 1.2 M, for example from about 0.5 M to about 1 M such as from about 0.5 M to about 0.8 M, for example from about 0.5 M to about 0.6 M, such as from about 1 M to about 2 M, for example from about 1 M to about 1.8 M, such as from about 1 M to about 1.5 M, for example from about 1 M to about 1.2 M, such as from about 1.5 M to about 2 M.

In some examples of the methods and systems provided herein, the concentration of the metal oxyanion or the non-metal oxyanion with the metal ion or the non-metal ion in the higher oxidation state exiting the anode chamber is from about 0.1 M to about 2 M, for example from about 0.1 M to about 1.8 M, for example from about 0.1 M to about 1.5 M, for example from about 0.1 M to about 1.2M, such as from about 0.1 M to about 1 M, for example from about 0.1 M to about 0.8 M, such as from about 0.1 M to about 0.6 M, for example from about 0.1 M to about 0.5 M, such as from about 0.1 M to about 0.4 M for example from about 0.5 M to about 2 M, such as from about 0.5 M to about 1.8 M, for example from about 0.5 M to about 1.5 M, such as from about 0.5 M to about 1.2 M for example from about 0.5 M, to about 1 M such as from about 0.5 M to about 0.8 M, for example from about 0.5 M to about 0.6 M, such as from about 1 M to about 2 M, for example from about 1 M to about 1.8 M, such as from about 1 M, to about 1.5 M, for example from about 1 M to about 1.2 M, such as from about 1.5 M to about 2 M.

It is to be understood that any combination of the aforementioned concentrations for the metal oxyanion with the metal ion in the lower oxidation state and the metal oxyanion with the metal ion in the higher oxidation state can be combined to achieve high efficiency. Similarly, it is to be understood that any combination of the aforementioned concentrations for the non-metal oxyanion with the non-metal ion in the lower oxidation state and the non-metal oxyanion with the non-metal ion in the higher oxidation state can be combined to achieve high efficiency.

For example, the concentration of the metal oxyanion with the metal ion in the lower oxidation state is from about 0.01 M to about 2 M, for example from about 0.01 M to about 1.5 M, such as from about 0.01 M to about 1 M, for example from about 0.1 M to about 1 M; and the concentration of the metal oxyanion with the metal ion in the higher oxidation state is from about 0.2 M to about 2 M, for example from about 0.3 M to about 2 M, such as from about 0.5 M to about 1 M, for example from about 0.3 M to about 1 M.

For example, the concentration of the non-metal oxyanion with the non-metal ion in the lower oxidation state is from about 0.01 M to about 2 M, for example from about 0.01 M to about 1.5 M, such as from about 0.01 M to about 1 M, for example from about 0.1 M to about 1 NI; and the concentration of the non-metal oxyanion with the non-metal ion in the higher oxidation state is from about 0.2 M to about 2 M, for example from about 0.3 M to about 2 M, such as from about 0.5 M to about 1 M, for example from about 0.3 M to about 1 M.

In some examples, the concentration of the metal oxyanion or the non-metal oxyanion with the metal ion or the non-metal ion in the lower oxidation state, and the concentration of the metal oxyanion or the non-metal oxyanion with the metal ion or the non-metal ion in the higher oxidation state, each individually or collectively, may affect the performance of each of the electrochemical cell/reaction, and the thermal reactor/reaction.

In some examples (as appropriate to the combination), the concentration of the metal oxyanion with the metal ion in the lower oxidation state entering the electrochemical reaction is from about 0.1 M to about −1 M; and the concentration of the metal oxyanion with the metal ion in the lower oxidation state entering the thermal reaction or entering the second electrochemical reaction (exiting the first electrochemical reaction) is from about 0.01 M to about 0.9 M.

In examples (as appropriate to the combination), the concentration of the non-metal oxyanion with the non-metal ion in the lower oxidation state entering the electrochemical reaction is from about 0.1 M to about 1 M; and the concentration of the non-metal oxyanion with the non-metal ion in the lower oxidation state entering the thermal reaction or entering the second electrochemical reaction (exiting the electrochemical reaction) is from about 0.01 M to about 0.9 M.

In some examples, the temperature of the anode electrolyte in the electrochemical cell/reaction is from about 50° C. to about 100° C., for example from about 60° C. to about 100° C., such as from about 70° C. to about 100° C.

The electrochemical cells in the methods and systems described herein may be membrane electrolyzers. The electrochemical cell may be a single cell or may be a stack of cells connected in series or in parallel. The electrochemical cell may be a stack of 5 or 6 or 50 or 100 or more electrolyzers connected in series or in parallel. Each cell comprises an anode, a cathode, and an ion exchange membrane.

In some examples, the electrochemical cells provided herein are monopolar electrolyzers. In monopolar electrolyzers, the electrodes may be connected in parallel where all anodes and all cathodes are connected in parallel. In such monopolar electrolyzers, the operation takes place at high amperage and low voltage. In some examples, the electrochemical cells described herein are bipolar electrolyzers. In bipolar electrolyzers, the electrodes may be connected in series where all anodes and all cathodes are connected in series. In such bipolar electrolyzers; the operation takes place at low amperage and high voltage. In some examples, the electrochemical cells described herein are a combination of monopolar and bipolar electrolyzers and may be called hybrid electrolyzers.

In some examples of bipolar electrolyzers, the cells are stacked serially constituting the overall electrolyzer and are electrically connected in two ways. In bipolar electrolyzers, a single plate, called a bipolar plate, can serve as a base plate for both the cathode and anode. The electrolyte solution can be hydraulically connected through common manifolds and collectors internal to the cell stack. The stack may be compressed externally to seal all frames and plates against each other, which are typically referred to as a filter press design. In some examples, the bipolar electrolyzer may also be designed as a series of cells, individually sealed, and electrically connected through back-to-back contact, typically known as a single element design. The single element design may also be connected in parallel in which case it would be a monopolar electrolyzer.

In some examples, the cell size may be denoted by the active area dimensions. In some examples, the active area of the electrochemical cells used herein can range from about 0.5 meters to about 1.5 meters tall and from about 0.4 meters to about 3 meters wide. In some examples, the individual chamber thicknesses can range from about 0.5 mm to about 50 mm.

The electrochemical cells used in the methods and systems provided herein can be made from corrosion resistant materials. Such corrosion resistance materials can include, but are not limited to, polyvinylidene fluoride, viton, polyether ether ketone, fluorinated ethylene propylene, fiber-reinforced plastic, halar, ultem (PEI), perfluoroalkoxy, tefzel, tyvar, fibre-reinforced plastic-coated with derakane 441-400 resin, graphite, akot, tantalum, hastelloy C2000, titanium Gr.7, titanium Gr.2, or combinations thereof. In some examples, these materials can be used for making the electrochemical cells and/or its components including; but not limited to, tank materials, piping, heat exchangers, pumps, reactors, cell housings, cell frames, electrodes, instrumentation, valves, and all other balance of plant materials. In some examples, the material used for making the electrochemical cell and its components include, but not limited to, titanium Gr.2.

In some examples, the anode may contain a corrosion stable, electrically conductive base support, such as, but not limited to, amorphous carbon, such as carbon black, fluorinated carbons available under the trademark SFC™ carbons. Other examples of electrically conductive base materials include, but are not limited to, sub-stoichiometric titanium oxides, such as Magneli phase sub-stoichiometric titanium oxides having the formula $TiO_x$ wherein x ranges from about 1.67 to about 1.9. Some examples of titanium sub-oxides include, without limitation, titanium oxide $Ti_4O_7$. The electrically conductive base materials can also include, without limitation, metal titanates such as $M_xTi_yO_z$ such as $M_xTi_4O_7$, etc. Some other examples include, without limitation, iron (in form of alloy e.g., steel), titanium, nickel, and their alloys. In some examples, carbon-based materials provide a mechanical support or as blending materials to enhance electrical conductivity but may not be used as catalyst support to prevent corrosion.

In some examples, the anode is not coated with an electrocatalyst. In some examples, the anode is made of an electro conductive base metal such as titanium coated with or without electrocatalysts. Some examples of electrically conductive base materials include, but are not limited to, sub-stoichiometric titanium oxides, such as Magneli phase sub-stoichiometric titanium oxides having the formula $TiO_x$ wherein x ranges from about 1.67 to about 1.9. Some examples of titanium sub-oxides include, without limitation, titanium oxide $Ti_4O_7$. The electrically conductive base materials also include, without limitation, metal titanates such as $M_xTi_yO_z$ such as $M_xTi_4O_7$, etc. Some other examples include, without limitation, iron (in form of alloy e.g., steel), titanium, nickel, and their alloys.

Examples of electrocatalysts include, but are not limited to, highly dispersed metals or alloys of the platinum group metals, such as platinum, palladium, ruthenium, rhodium, iridium, or their combinations such as platinum-rhodium, platinum-ruthenium, titanium mesh coated with Par mixed metal oxide or titanium coated with galvanized platinum; electrocatalytic metal oxides; such as, but not limited to, $IrO_2$; gold, tantalum, carbon, graphite, organometallic macrocyclic compounds, and other electrocatalysts well known in the art. The electrodes can be coated with electrocatalysts using processes well known in the art.

In some examples, the electrodes described herein can comprise porous homogeneous composite structures as well as heterogeneous, layered type composite structures wherein each layer may have a distinct physical and compositional make-up, e.g., porosity and electroconductive base to prevent flooding, and loss of the three phase interface, and resulting electrode performance.

In some examples, the electrodes can include anodes and cathodes having porous polymeric layers on or adjacent to the anolyte or catholyte solution side of the electrode which may assist in decreasing penetration and electrode fouling. Stable polymeric resins or films may be included in a composite electrode layer adjacent to the anolyte comprising resins formed from non-ionic polymers, such as polystyrene, polyvinyl chloride, polysulfone, etc., or ionic-type charged polymers like those formed from polystyrenesulfonic acid, sulfonated copolymers of styrene and vinylbenzene, carboxylated polymer derivatives, sulfonated or carboxylated polymers having partially or totally fluorinated hydrocarbon chains and aminated polymers like polyvinyipyridine. Stable microporous polymer films may also be included on the dry side to inhibit electrolyte penetration. In some examples, the gas-diffusion cathode includes such cathodes known in the art that are coated with high surface area coatings of precious metals such as gold and/or silver, precious metal alloys, nickel, and the like.

In some examples, the cation exchange membranes in the electrochemical cells disclosed herein can be conventional and are available from, for example, Asahi Kasei of Tokyo, Japan; or from Membrane international of Glen Rock, N.J., or DuPont, in the USA. Examples of CEMs include, but are not limited to, N2030WX (Dupont), F8020/F8080 (Flemion), and F6801. (Aciplex). CEMs that are desirable in the methods and systems herein may have minimal resistance loss, greater than 90% selectivity, and high stability. AEMs in the methods and systems herein can be exposed to concentrated metal or non-metal oxyanion containing anolytes. For example, a fully quarternized amine containing polymer may be used as an AEM.

Examples of cationic exchange membranes include, but are not limited to, a cationic membrane comprising a perfluorinated polymer containing anionic groups, for example sulphonic and/or carboxylic groups. However, it may be appreciated that in some examples, depending on the need to restrict or allow migration of a specific cation or an anion species between the electrolytes, a cation exchange membrane that is more restrictive and thus allows migration of one species of cation while restricting the migration of another species of cation may be used. Similarly, in some examples, depending on the need to restrict or allow migration of a specific anion species between the electrolytes, an anion exchange membrane that is more restrictive and thus allows migration of one species of anion while restricting the migration of another species of anion may be used. Such restrictive cation exchange membranes or anion exchange membranes are commercially available and can be selected by one ordinarily skilled in the art.

In some examples, the membrane may be selected such that it can function in an acidic and/or alkaline electrolytic solution as appropriate. Other desirable characteristics of the membranes include high ion selectivity, low ionic resistance, high burst strength, and high stability in electrolytic solution in a temperature range of room temperature to 150° C. or higher. In some examples, it is desirable that the ion exchange membrane reduces or minimizes the transport of the metal oxyanion or the non-metal oxyanion from the analyte to the catholyte.

In some examples, the membrane is stable in the temperature range of from about 0° C. to about 150° C., for example from about 0° C. to about 100° C., such as from about 0° C. to about 90° C., for example from 0° C. to about 80° C., such as from about 0° C. to about 70° C., for example from about 0° C. to about 60° C., such as from about 0° C. to about 50° C., for example from about 0° C. to about 40° C., such as from about 0° C. to about 30° C., or higher may be used. For other examples, it may be useful to utilize an ion-specific ion exchange membrane that allows migration of one type of cation but not another; or migration of one type of anion and not another, to achieve a desired product or products in an electrolyte.

The ohmic resistance of the membrane can affect the voltage drop across the anode and cathode, e.g., as the ohmic resistance of the membrane increase, the voltage across the anode and cathode may increase, and vice versa. Membranes that can be used include, but are not limited to, a membrane with relatively low ohmic resistance and relatively high ionic mobility; and a membrane with relatively high hydration characteristics that increase with temperatures, and thus decreasing the ohmic resistance. By selecting a membrane with lower ohmic resistance known in the art, the voltage drop across the anode and the cathode at a specified temperature can be lowered.

In some examples, the anode electrolyte comprises from about 0.3 M to about 5 M, for example from about 0.3 M to about 4.5 M, such as from about 0.3 M to about 4 M, for example from about 0.3 M to about 3.5 M, such as from about 0.3 M to about 3 M, for example from about 0.3 M, to about 2.5 M, such as from about 0.3 M to about 2 M, for example from about 0.3 M, to about 1.5 M, such as from about 0.3 M to about 1M, for example from about 0.3 M to about 0.5 M, such as from about 0.5 M to about 5 M, for example from about 0.5 M to about 4.5 M, such as from about 0.5 M to about 4 M, for example from about 0.5 M to about 3.5 M, such as from about 0.5 M to about 3 M, for example from about 0.5 M to about 2.5 M, such as from about 0.5 M to about 2 M, for example from about 0.5 M to about 1.5 M, such as from about 0.5 M to about 1 M, for example from about 1 M to about 5 M, such as from about 1 M to about 4.511, for example from about 1 M to about 4 M, such as from about 1 M to about 3.5 M, for example from about 1 M to about 3 M, such as from about 1 M to about 2.5 M, for example from about 1 M, to about 2 M, such as from about 1 M to about 1.5 M, for example from about 2 M to about 5 M, such as from about 2 M to about 4.5 M, for example from about 2 M, to about 4 M, such as from about 2 M, to about 3.5 M, for example from about 2 M to about 3 M, such as from about 2 M to about 2.5 M, for example from about 3 M to about 5 M, such as from about 3 M to about 4.5 M, for example from about 3 M to about 4 M, such as from about 3 M to about 3.5 M, for example from about 4 M to about 5 M of the total metal oxyanion solution (comprising both the metal oxyanion with the metal ion in the lower oxidation state and the metal oxyanion with the metal ion in the higher oxidation state).

In some examples, the anode electrolyte comprises between about 0.3 M to about 5 M, for example from about 0.3 M to about 4.5 M, such as from about 0.3 M to about 4 M, for example from about 0.3 M to about 3.5 M, such as from about 0.3 M to about 3 M, for example from about 0.3 M to about 2.5 M, such as from about 0.3 M to about 2 M, for example from about 0.3 M to about 1.5 M, such as from about 0.3 M to about 1 M, for example from about 0.3 M to about 0.5 M, such as from about 0.5 M to about 5 M, for example from about 0.5 M to about 4.5 M, such as from about 0.5 M to about 4 M, for example from about 0.5 M to about 3.5 M, such as from about 0.5 M to about 3 M, for example from about 0.5 M to about 2.5 M, such as from about 0.5 M to about 2 M, for example from about 0.5 M to about 1.5 M, such as from about 0.5 M to about 1 M, for example from about 1 M, to about 5 M, such as from about 1 M, to about 4.5 M, such as from about 1 M to about 4 M, for example from about 1 M to about 3.5 M, such as from about 1 M to about 3 M, for example from about 1 M to about 2.5 M, such as from about 1 M to about 2 M, for example from about 1 M to about 1.5 M, such as from about 2 M to about 5 M, for example from about 2 M to about 4.5 M, such as from about 2 M to about 4 M, for example from about 2 M to about 3.5 M, such as from about 2 M to about 3 M, for example from about 2 M to about 2.5 M, such as from about 3 M to about 5 M, for example from about 3 M to about 4.5 M, such as from about 3 M to about 4 M, for example from about 3 M to about 3.5 M, such as from about 4 M to about 5 M of the total non-metal oxyanion solution (comprising both the non-metal oxyanion with the non-metal ion in the lower oxidation state and the non-metal oxyanion with the non-metal ion in the higher oxidation state).

Depending on the degree of alkalinity desired in the cathode electrolyte, the pH of the cathode electrolyte may be adjusted and in some examples, maintained from about 7 to about 15, for example from about 7 to about 14 or greater, such as from about 7 to about 13, for example from about 7 to about 12, such as from about 7 to about 11, for example from about 10 to about 14 or greater, such as from about 10 to about 13, for example from about 10 to about 12, such as from about 10 to about 11. In some examples, the pH of the cathode electrolyte can be adjusted to any value from about 7 to about 14 or greater, a pH less than 12, or a pH of 7.0, 7.5, 8.0, 8.5, 9.0, 9.5, 10.0, 10.5, 11.0, 11.5, 12.0, 12.5, 13.0, 13.5, 14.0, and/or greater.

The voltage across the anode and cathode may be dependent on several factors, including the difference in pH between the anode electrolyte and the cathode electrolyte (as can be determined by the Nernst equation) In some examples, the pH of the anode electrolyte can be adjusted to a value of from about 9 to about 15 depending on the desired operating voltage across the anode and cathode.

As used herein, the term "voltage" includes a voltage or a bias applied to or drawn from an electrochemical cell that drives a desired reaction between the anode and the cathode in the electrochemical cell. In some examples, the desired reaction may be the electron transfer between the anode and the cathode such that hydrogen gas is formed at the cathode and the metal oxyanion or the non-metal oxyanion is oxidized at the anode. The voltage may be applied to the electrochemical cell by any means for applying the current across the anode and the cathode of the electrochemical cell. Such means are well known in the art and include, without limitation, devices, such as, electrical power source, fuel cell, device powered by sun light, device powered by wind, and combination thereof. The type of electrical power source to provide the current can be any power source known to one skilled in the art. For example, in some examples, the voltage may be applied by connecting the anodes and the cathodes of the cell to an external direct current (DC) power source. The power source can be an alternating current (AC) rectified into DC. The DC power source may have an adjustable voltage and current to apply a requisite amount of the voltage to the electrochemical cell.

In some examples, the current applied to the electrochemical cell is at least about 50 $mA/cm^2$, for example at least about 100 $mA/cm^2$, such as at least about 150 $mA/cm^2$, for example at least about 200 $mA/cm^2$, such as at least about 500 $mA/cm^2$, for example at least about 1000 $mA/cm^2$, such as at least about 1500 $mA/cm^2$, for example at least about 2000 $mA/cm^2$, such as at least about 2500 $mA/cm^2$, for example from about 100 $mA/cm^2$ to about 2500 $mA/cm^2$, such as from about 100 $mA/cm^2$ to about 2000 $mA/cm^2$, for example from about 100 $mA/cm^2$ to about 1500 $mA/cm^2$, such as from about 100 $mA/cm^2$ to about 1000 $mA/cm^2$, for example from about 100 $mA/cm^2$ to about 500 $mA/cm^2$, such as from about 200 $mA/cm^2$ to about 2500 $mA/cm^2$, for example from about 200 $mA/cm^2$ to about 2000 $mA/cm^2$, such as from about 200 $mA/cm^2$ to about 1500 $mA/cm^2$, for example from about 200 $mA/cm^2$ to about 1000 $mA/cm^2$, such as from about 200 $mA/cm^2$ to about 500 $mA/cm^2$, for example from about 500 $mA/cm^2$ to about 2500 $mA/cm^2$, such as from about 500 $mA/cm^2$ to about 2000 $mA/cm^2$, for example from about 500 $mA/cm^2$ to about 1500 $mA/cm^2$, such as from about 500 $mA/cm^2$ to about 1000 $mA/cm^2$, for example from about 1000 $mA/cm^2$ to about 2500 mA/cm$^2$, such as from about 1000 mA/cm$^2$ to about 2000 mA/cm$^2$, for example from about 1000 mA/cm$^2$ to about 1500 mA/cm$^2$, such as from about 1500 mA/cm$^2$ to about 2500 mA/cm$^2$, for example from about 1500 mA/cm$^2$ to about 2000 mA/cm$^2$, such as from about 2000 mA/cm$^2$ to about 2500 mA/cm$^2$.

In some examples, at least a portion of the anode electrolyte is transferred outside the electrochemical cell to a thermal reactor using any means for transferring the solution. The examples include, without limitation, conduits, pipes, tubes, and other means for transferring the liquid solutions. In some examples, the conduits attached to the systems also include means for transferring gases such as, but not limited to, pipes, tubes, tanks, and the like.

In some examples, the use of electrochemical and/or thermal reaction may be varied with time throughout the day. For example, the thermal reactor/reaction may be run during peak power price times as compared to electrochemical cell/reaction thereby reducing the energy use. For example, the thermal reactor/reaction may be run in the daytime while the electrochemical cell/reaction may be run in the nighttime in order to save the cost of energy or vice versa.

The systems provided herein can include a thermal reactor that carries out the thermal reaction of the anode electrolyte comprising metal oxyanion or the non-metal oxyanion to form the oxygen gas. The term "reactor," as used herein, can be any vessel or unit in which the reaction provided herein, is carried out. The thermal reactor can be configured to heat the anode electrolyte comprising metal oxyanion with the metal ion in the higher oxidation state to form the oxygen gas and reduce the metal oxyanion to the metal ion in the lower oxidation state. Similarly, the thermal reactor can be configured to heat the anode electrolyte comprising non-metal oxyanion with the non-metal ion in the higher oxidation state to form the oxygen gas and reduce the non-metal oxyanion to the non-metal ion in the lower oxidation state. The reactor may be any means for contacting the contents as mentioned above. Such means or such reactor are well known in the art and include, but not limited to, pipe, column, duct, tank, series of tanks, container, tower, conduit, and the like. The reactor can be equipped with one or more of controllers to control temperature sensor, pressure sensor, control mechanisms, inert gas injector, etc, to monitor, control, and/or facilitate the reaction. In some examples, the reactor is made from corrosion resistant materials.

In some examples, the thermal reactor system may be one reactor, or a series of reactors connected to each other. The thermal reactor may be a stirred tank. The stirring may facilitate distribution of the heat into the metal oxyanion or the non-metal oxyanion thereby accelerating the thermal reaction to form the oxygen gas. The thermal reactor may be made of material that is compatible with the aqueous or the saltwater streams containing the metal oxyanion or the non-metal oxyanion. In some examples, the thermal reactor is made of corrosion resistant materials that are compatible with the metal oxyanion or the non-metal oxyanions containing water, such materials include, titanium, steel etc.

The reactor effluent gases may be collected and optionally compressed. The liquid leaving the tower maybe cooled and recycled back to the tower or may be split part being recycled to the tower and the remainder may be recycled to the anode chamber of the electrochemical cell. The construction material of the plant or the systems may include prestressed brick linings, Hastealloys B and C, inconel, dopant grade titanium (e.g., AKOT, Grade II), tantalum, Kynar, Teflon, PEEK, glass, or other polymers or plastics. The reactor may also be designed to continuously flow the anode electrolyte in and out of the reactor.

In some examples, the thermal reaction of the metal oxyanion or the non-metal oxyanion to form the oxygen gas is carried out in the reactor under one or more reaction conditions including, but not limited to, a temperature from about 50° C. to about 500° C., for example from about 50° C. to about 400° C., such as from about 50° C. to about 300 for example from about 50° C. to about 200° C., such as from about 50° C. to about 100° C.; a pressure of from about 10 psig to about 500 psig, for example from about 10 psig to about 400 psig, such as from about 10 psig to about 300 psig, for example from about 10 psig to about 200 psig, such as from about 10 psig to about 100 psig, for example from about 50 psig to about 350 psig, such as from about 200 psig to about 300 psig; in the presence of hydroxide ions; in the presence of a catalyst; at a pH of more than about 10; or combinations thereof.

In some examples, the thermal reaction of the metal oxyanion or the non-metal oxyanion to form oxygen gas can be facilitated by the presence of a catalyst. Examples of catalysts include, but are not limited to, metal oxide, such as, e.g., manganese oxide, ruthenium oxide, silicon oxide, iron oxide, or aluminum oxide, the like; and/or a non-metal halide, such as e.g., alkali metal halide or alkali earth metal halide or lanthanide halide. In some examples, an ion, such as, e.g., $Co^{2+}$, $Ni^{2+}$, $Fe^{2+}$, $Ag^+$, $Cu^{2+}$, $Mn^{2-}$, $Sn^{4+}$, $Pb^{2+}$, $Ca^{2+}$, $Cl^-$, $CO_3^{2-}$, $MoO_4^{2-}$, $WO_4^{2-}$, $SiO_4^{4-}$, may act as a catalyst for the evolution of the oxygen gas in the thermal reactor. In some examples, the concentration of the ion can be from about $10^{-10}$ N to about $10^{-1}$ M, for example from about $10^{-9}$ M to about $10^{-4}$ M.

In some examples, the thermal reaction of the metal oxyanion or the non-metal oxyanion to form oxygen gas is facilitated by the presence of hydroxide ions or a pH of more than about 10, such as from about 10 to about 12, for example from about 10 to about 14.

Reaction heat can be removed by vaporizing water or by using heat exchange units. In some examples, a cooling surface may not be required in the reactor and thus no temperature gradients or close temperature control may be needed.

In some examples, the system is heat integrated to minimize operating costs. Various heat integration approaches can be used in the methods and systems provided herein. In some examples, the system further comprises a feed/effluent heat exchanger between the electrochemical cell and the thermal reactor that serves to recover heat from the solution leaving the thermal reactor/reaction into the stream entering the thermal reactor/reaction. In some examples, a portion of the heat used in the thermal reactor/reaction is provided by heat from another process. This heat from another process can be waste heat that is not economically recoverable under normal conditions or is on-purpose heat from a clean source of heat such as a solar thermal system, a geothermal system, or a nuclear process. In some examples, the heat from another process can be that generated by the compression of hydrogen up to delivery pressure or some other fluid pressurization work.

In some examples of the methods and systems described herein, at least one of the electrochemical cell/reaction or the thermal reactor/reaction is operated at elevated pressure. Because of the requirements for hydrogen delivery pressure, in some examples, it may be advantageous to operate the electrochemical cell at a pressure above atmospheric. One concern with high pressure operation of a water-splitting electrochemical cell generating hydrogen at the cathode and oxygen at the anode may be the risk of internal component failure leading to an explosive mixture. In some examples, oxygen is not generated or is generated in very small amounts within the electrochemical cell, thereby lowering this risk. In some examples, the minimal amount of the oxygen gas formed at the anode may contaminate the hydrogen gas formed at the cathode. In such examples, a hydrogen oxygen separator can be operably connected to the electrochemical system/method herein to separate the hydrogen gas from the oxygen gas. Examples of such separators include, without limitation, a membrane or other porous separator. Such separators are commercially available.

In some examples, operating the thermal reactor/reaction at lower pressure can facilitate release of oxygen. Thus, operating the thermal reactor/reaction at lower pressure can be done to reduce the overall cost of production, for reasons of process safety or for other reasons. For example, the electrochemical cell can be operated at higher pressure to reduce the cost of compression of the hydrogen while the thermal reactor/reaction can be operated at lower pressure to facilitate oxygen evolution. In some examples, the thermal reactor/reaction may occur under vacuum and then be compressed to atmospheric pressure. The economics of the reaction may depend on the relative sources of heat and costs of compression.

In some examples, the electrochemical cell is operated at a pressure from about 40 psi to about 500 psi, for example from about 40 psi to about 400 psi, such as from about 40 psi to about 300 psi, for example from about 40 psi to about 200 psi, such as from about 40 psi to about 100 psi, for example from about 100 psi to about 200 psi, such as from about 200 psi to about 300 psi, for example from about 300 psi to about 400 psi, such as from about 400 psi to about 500 psi, for example from about 500 psi to about 3000 psi. In some examples, the thermal reaction is operated at a pressure from about 14 psi to about 300 psi, for example from about 14 psi to about 200 psi, such as from about 14 psi to about 100 psi, for example from about 14 psi to about 50 psi.

In some examples, the system can include one reactor, or a series of multiple reactors connected to each other or operating separately. The reactor may be a packed bed such as, but not limited to, a hollow tube, pipe, column, or other vessel filled with packing material. The reactor may be a trickle-bed reactor. In some examples, the reactor may be a tray column or a spray tower. Any of the configurations of the reactor described herein may be used to carry out the methods/systems provided herein.

The metal oxyanion or the non-metal oxyanion solution may be agitated by stirring or shaking or any desired technique, e.g., the reaction may be carried out in a column, such as a packed column, or a trickle-bed reactor or reactors described herein. For example, when oxygen gas is formed, a counter-current technique may be employed wherein the oxygen gas passes upwardly through a column or reactor and the metal oxyanion or the non-metal oxyanion solution is passed downwardly through the column or reactor.

A variety of packing material of various shapes, sizes, structure, wetting characteristics, form, and the like may be used in the packed bed or trickle bed reactor, described herein. The packing material can include, but is not limited to, polymer (e.g., only Teflon PTFE), ceramic, glass, metal, natural (wood or bark), or combinations thereof. In some examples, the packing material can be structured packing or loose or unstructured or random packing or combination thereof. Examples of structured packing include, but are not limited to, unflowable corrugated metal plates or gauzes. In some examples, the structured packing material individually or in stacks fits fully in the diameter of the reactor. The unstructured packing or loose packing or random packing can include flowable void filling packing material.

Examples of loose or unstructured or random packing material include, but are not limited to, Raschig rings (such as in ceramic material), pall rings (e.g., in metal and plastic), tossing rings, Michael Bialecki rings (e.g., in metal), berl saddles, intalox saddles (e.g., in ceramic), super intalox saddles, tellerette® ring (e.g., spiral shape in polymeric material), etc.

Examples of structured packing material include, but are not limited to, thin corrugated metal plates or gauzes (honeycomb structures) in different shapes with a specific surface area. Structured packing material may be used as a ring or a layer or a stack of rings or layers that have diameter that may fit into the diameter of the reactor. The ring may be an individual ring or a stack of rings fully filling the reactor. In some examples, the voids left out by the structured packing in the reactor are filled with the unstructured packing material.

Examples of structured packing material include, without limitation, Flexipac®, Intalox®, Flexipac® HC®, etc. In a structured packing material, corrugated sheets may be arranged in a crisscross pattern to create flow channels for the vapor phase. The intersections of the corrugated sheets may create mixing points for the liquid and vapor phases. The structured packing material may be rotated about the column (reactor) axis to provide cross mixing and spreading of the vapor and liquid streams in all directions. The structured packing material may be used in various corrugation sizes and the packing configuration may be optimized to attain the highest efficiency, capacity, and pressure drop requirements of the reactor. The structured packing material may be made of a material of construction including, but not limited to, titanium, stainless steel alloys, carbon steel, aluminum, nickel alloys, copper alloys, zirconium, thermoplastic, etc. The corrugation crimp in the structured packing material may be of any size, including, but not limited to, Y designated packing having an inclination angle of 45° from the horizontal or X designated packing having an inclination angle of 60° from the horizontal. The X packing may provide a lower pressure drop per theoretical stage for the same surface area. The specific surface area of the structured packing may be from about 50-800 $m^2/m^3$, for example from about 75 $m^2/m^3$ to about 350 $m^2/m^3$, such as from about 200 $m^2/m^3$ to about 800 $m^2/m^3$, for example from about 150 $m^2/m^3$ to about 800 $m^2/m^3$, such as from about 500 $m^2/m^3$ to about 800 $m^2/m^3$.

The systems provided herein are applicable to or can be used for any of one or more methods described herein. In some examples, the systems provided herein further include an oxygen gas delivery system operably connected to the thermal reactor. The oxygen gas delivery system can be configured to provide oxygen gas to the oxygen gas collection unit. The oxygen gas may be delivered to the oxygen gas collection unit using any means for directing the oxygen gas from the thermal reactor. Such means for directing the oxygen gas from the thermal reactor to the oxygen gas delivery system are well known in the art and include, but are not limited to, pipe, duct, conduit, and the like. In some examples, the oxygen gas from the thermal reactor may be purified before being collected and optionally compressed.

In some examples, the reactor and/or the electrochemical cell and its components, as provided herein, can include a control station, configured to control one or more of the amount of the metal oxyanion or the non-metal oxyanion introduced into the anode chamber of the electrochemical cell, the amount of the anode electrolyte introduced into the thermal reactor or the second electrochemical cell, the temperature and pressure of the units, amount of the water, the flow rate in and out of the reactor, the time and the flow rate of the water going back to the electrochemical cell, etc.

The control station can include a set of valves or multi-valve systems which are manually, mechanically, or digitally controlled, or may employ any other convenient flow regulator protocol. In some examples, the control station can include a computer interface, (where regulation is computer-assisted or is entirely controlled by computer) configured to provide a user with input and output parameters to control the amount and conditions.

The methods and systems can also include one or more detectors configured for monitoring the flow of gases or the concentration of the metal oxyanion or the non-metal oxyanion in the water/saltwater etc. Monitoring can include, but is not limited to, collecting data about the pressure, temperature, and composition of the aqueous medium and gases. The detectors can be any convenient device configured to monitor, for example, pressure sensors (e.g., electromagnetic pressure sensors, potentiometric pressure sensors, etc.), temperature sensors (e.g., resistance temperature detectors, thermocouples, gas thermometers, thermistors, pyrometers, infrared radiation sensors, etc.), volume sensors (e.g., geophysical diffraction tomography, X-ray tomography, hydroacoustic surveyors, etc.), and devices for determining chemical makeup of the aqueous medium or the gas (e.g., IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some examples, the detectors can also include a computer interface which is configured to provide a user with collected data about the electrolyte, the metal oxyanion or the non-metal oxyanion and/or the salt. For example, a detector can determine the concentration of the metal oxyanion or the non-metal oxyanion and the computer interface may provide a summary of the changes in the composition within the electrolyte over time. In some examples, the summary may be stored as a computer readable data file or may be printed out as a user readable document.

In some examples, the detector can be a monitoring device such that it can collect real-time data (e.g., internal pressure, temperature, etc.) about the electrolyte, the metal oxyanion or the non-metal oxyanion, and/or the salt ion. In other examples, the detector can be one or more detectors configured to determine the parameters of the metal oxyanion or the non-metal oxyanion, and/or the salt ion at regular intervals, e.g., determining the composition every 1 minute, every 5 minutes, every 10 minutes, every 30 minutes, every 60 minutes, every 100 minutes, every 200 minutes, every 500 minutes, or some other interval.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Electrochemical Half Cell Reaction for Metal Oxyanion Oxidation

Figure 8:
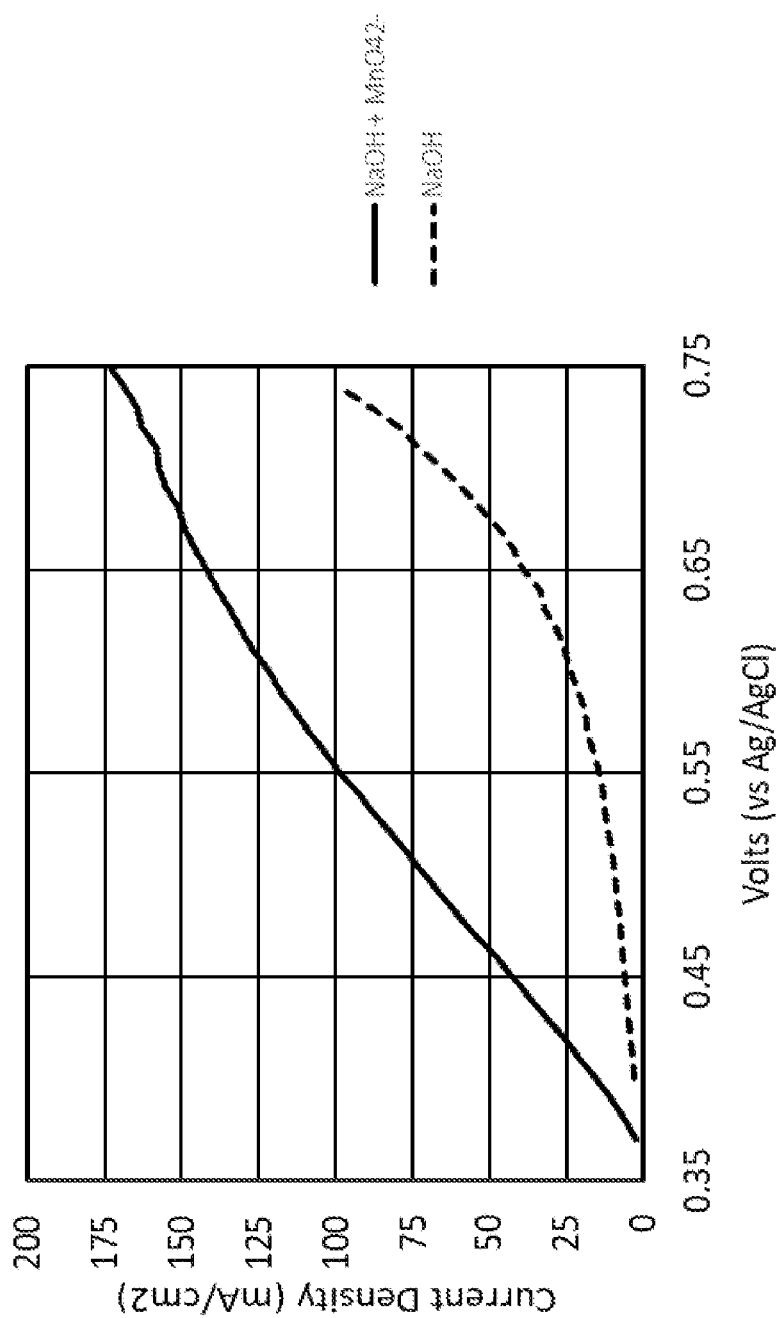
FIG. 8 illustrates half cell reaction of manganate oxidation, as described in Example 1 herein.

An electrochemical cell was constructed in a stirred beaker to study the anodic half-cell reaction of the oxygen evolution and the manganate ($MnO_4^2$) oxidation. The cell had a nickel gauze anode, a platinum foil cathode, and an Ag/Aga reference electrode. Liner sweep voltammetry was performed on a solution of 9 M NaOH and on a solution of 9 M NaOH with 0.25 M $MnO_4^{2-}$ at 25° C. Results are shown in FIG. 8. Oxidation at the anode required 190 mV less to sustain a current density of 100 mA/cm$^2$. At 0.55 V (vs. Ag/AgCl), the manganate solution sustained 100 mA/cm$^2$, whereas the solution with only NaOH sustained 14 mA/cm$^2$.

Example 2

Thermal Reaction of the Permanganate to the Manganate and the Oxygen Gas

Figure 9:
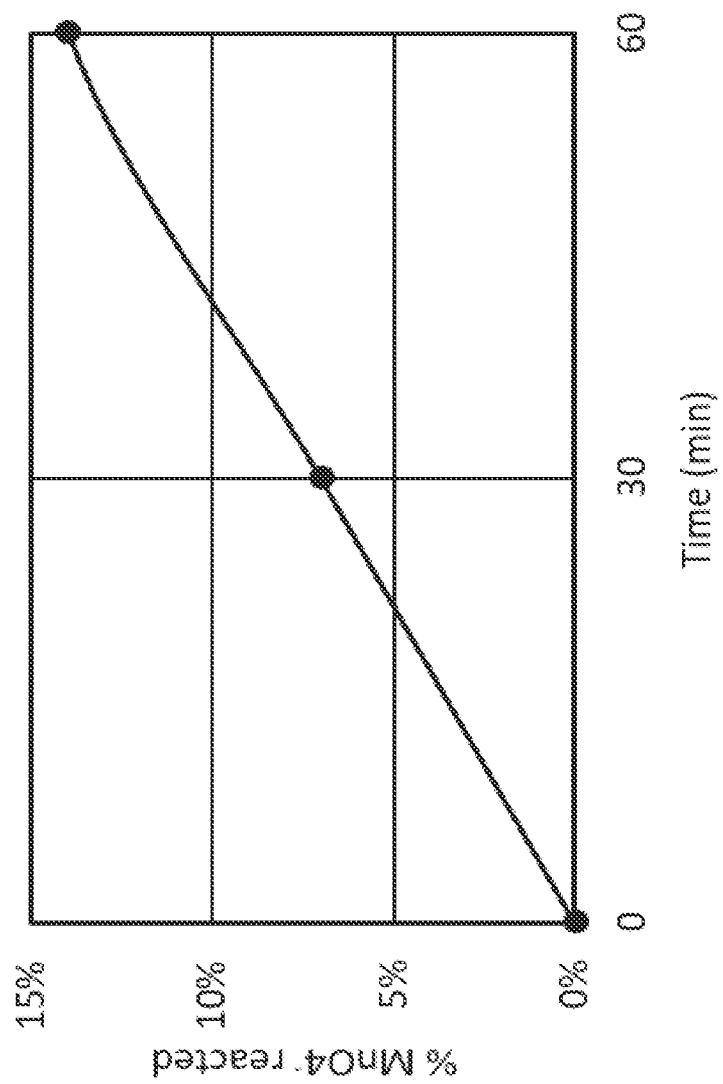
FIG. 9 illustrates thermal reaction of permanganate, as described in Example 2 herein.

A sealed container with 10 mL of 8 M NaOH and 0.6 M $MnO_4^-$ (permanganate ion) was placed in a water bath at 100° C. Samples were taken after 30 and 60 minutes. The amount of permanganate reacted to manganate ($MnO_4^{2-}$) is as shown in FIG. 9. After 1 hour, 14% of the permanganate had reacted. Concentrations were determined by UV-vis spectroscopy.

Example 3

Oxidation of the Metal Oxyanion and Generation of the Hydrogen and the Oxygen Gas An electrochemical cell with an anode and a cathode was constructed with an anion exchange membrane separating the chambers. The cell was fed an aqueous solution of 0.4 M potassium permanganate ($KMnO_4$), 0.2 M potassium manganate ($K_2MnO_4$), and 6 M potassium hydroxide (KOH) to the anode chamber and an aqueous solution of potassium hydroxide to the cathode chamber. A potential between 1.3 V and 3 V, depending on the total current desired, was applied between the anode and cathode. The manganate was oxidized to the permanganate at the anode and water was reduced to hydrogen gas and hydroxide at the cathode. The hydroxide ions maintained charge balance of the system by passing through the anion exchange membrane from the cathode chamber to the anode chamber. The amount of manganate oxidized to permanganate was about 0.1 M.

The hydrogen from the cathode chamber was separated from the aqueous KOH solution with a vessel for gas-liquid separation. The aqueous KOH solution from the cathode chamber was reconstituted with an amount of water to replace the water that was reduced and recirculated to an intermediate feed tank that feeds the cathode chamber.

The solution from the anode chamber was passed into a thermal reactor. In this thermal reactor, the solution was heated to a higher temperature, around 100° C., to affect oxygen evolution and permanganate reduction, which also consumed hydroxide and generated manganate and water. Water from this reactor was separated by condensation and some of the water was used to reconstitute the aqueous KOH solution fed to the cathode chamber. The aqueous solution of $KMnO_4$, $K_2MnO_4$ and KOH from the thermal reactor was fed back to an intermediate tank for feeding into the anode chamber.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method to generate hydrogen gas, comprising:
   providing an anode and an anode electrolyte in an electrochemical cell wherein the anode electrolyte comprises a metal oxyanion with a metal ion in a lower oxidation state or a non-metal oxyanion with a non-metal ion in a lower oxidation state;
   oxidizing the metal oxyanion with the metal ion in the lower oxidation state to a metal oxyanion with metal ion in a higher oxidation state or oxidizing the non-metal oxyanion with the non-metal ion in the lower oxidation state to a non-metal oxyanion with non-metal ion in a higher oxidation state at the anode;
   providing a cathode and a cathode electrolyte in the electrochemical cell and forming hydrogen gas and hydroxide ions at the cathode; and
   maintaining a steady-state pH differential of between about 1-6 between the anode electrolyte and the cathode electrolyte.

2. The method of claim 1, further comprising separating the anode electrolyte from the cathode electrolyte by an anion exchange membrane and migrating the hydroxide ions from the cathode electrolyte to the anode electrolyte.

3. The method of claim 1, wherein the metal ion in the metal oxyanion is selected from the group consisting of manganese, iron, chromium, selenium, copper, tin, silver, cobalt, uranium, lead, mercury, vanadium, bismuth, titanium, ruthenium, osmium, europium, zinc, cadmium, gold, nickel, palladium, platinum, rhodium, iridium, technetium, rhenium, molybdenum, tungsten, niobium, tantalum, zirconium, hafnium, and combination thereof.

4. The method of claim 1, wherein the metal oxyanion with the metal ion in the lower oxidation state is selected from the group consisting of $MnO_4^{2-}$, $FeO_4^{2-}$, $RuO_4^{2-}$, $OsO_4^{2-}$, $HSnO_2^-$, $SeO_3^{2-}$, $Cu_2O$, $CrO_3^{3-}$, and $TeO_3^{2-}$.

5. The method of claim 1, wherein the metal oxyanion with the metal ion in the higher oxidation state is selected from the group consisting of $MnO_4^-$, $HFeO_2^-$, $RuO_4^-$, $OsO_5^{2-}$, $SnO_3^{2-}$, $SeO_4^{2-}$, $CuO_2^{2-}$, $CrO_4^{2-}$, and $TeO_4^{2-}$.

6. The method of claim 1, wherein the non-metal ion in the non-metal oxyanion is selected from the group consisting of halogen, carbon, sulfur, nitrogen, and phosphorus.

7. The method of claim 1, wherein the non-metal oxyanion with the non-metal ion in the lower oxidation state is selected from the group consisting of $NO_2^-$, $PO_3^{3-}$, $SO_3^{2-}$, $ClO^-$, $ClO_2^-$, $ClO_3^-$, $BrO^-$, $BrO_2^-$, $BrO_3^-$, $IO^-$, $IO_2^-$, and $IO_3^-$ and/or the non-metal oxyanion with the non-metal ion in the higher oxidation state is selected from the group consisting of $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, and $IO_4^-$.

8. The method of claim 1, further comprising oxidizing hydroxide ions at the anode to form oxygen gas.

9. The method of claim 8, further comprising
operating the electrochemical cell at a first current density for the oxidation of the metal oxyanion with the metal ion in the lower oxidation state to the metal oxyanion with the metal ion in the higher oxidation state or for the oxidation of the non-metal oxyanion with the non-metal ion in the lower oxidation state to the non-metal oxyanion with the non-metal ion in the higher oxidation state at the anode; and
operating the electrochemical cell at a second current density for the oxidation of the hydroxide ions at the anode to form oxygen gas, wherein the second current density is higher than the first current density.

10. The method of claim 1, further comprising:
transferring at least a portion of the anode electrolyte comprising the metal oxyanion with the metal ion in the higher oxidation state or the non-metal oxyanion with the non-metal ion in the higher oxidation state outside the electrochemical cell to a second cathode electrolyte of a second electrochemical cell; and
reducing the metal oxyanion with the metal ion in the higher oxidation state to the lower oxidation state or reducing the non-metal oxyanion with the non-metal ion in the higher oxidation state to the lower oxidation state at a second cathode of the second electrochemical cell.

11. The method of claim 1, wherein no oxygen gas is formed at the anode or less than 25% of the Faradaic efficiency is for the oxygen evolution reaction at the anode.

12. A method to generate hydrogen gas, comprising:
providing an anode and an anode electrolyte in an electrochemical cell wherein the anode electrolyte comprises a metal oxyanion with a metal ion in a lower oxidation state or a non-metal oxyanion with a non-metal ion in a lower oxidation state;
oxidizing the metal oxyanion with the metal ion in the lower oxidation state to a metal oxyanion with metal ion in a higher oxidation state or oxidizing the non-metal oxyanion with the non-metal ion in the lower oxidation state to a non-metal oxyanion with non-metal ion in a higher oxidation state at the anode; and
providing a cathode and a cathode electrolyte in the electrochemical cell and forming hydrogen gas and hydroxide ions at the cathode,
wherein no oxygen gas is formed at the anode or less than 25% of the Faradaic efficiency is for the oxygen evolution reaction at the anode.

13. The method of claim 12, wherein the metal ion in the metal oxyanion is selected from the group consisting of manganese, iron, chromium, selenium, copper, tin, silver, cobalt, uranium, lead, mercury, vanadium, bismuth, titanium, ruthenium, osmium, europium, zinc, cadmium, gold, nickel, palladium, platinum, rhodium, iridium, technetium, rhenium, molybdenum, tungsten, niobium, tantalum, zirconium, hafnium, and combination thereof.

14. The method of claim 12, wherein the metal oxyanion with the metal ion in the lower oxidation state is selected from the group consisting of $MnO_4^{2-}$, $FeO_4^{2-}$, $RuO_4^{2-}$, $OsO_4^{2-}$, $HSnO_2^-$, $SeO_3^{2-}$, $Cu_2O$, $CrO_3^{3-}$, and $TeO_3^{2-}$.

15. The method of claim 12, wherein the metal oxyanion with the metal ion in the higher oxidation state is selected from the group consisting of $MnO_4^-$, $HFeO_2^-$, $RuO_4^-$, $OsO_5^{2-}$, $SnO_3^{2-}$, $SeO_4^{2-}$, $CuO_2^{2-}$, $CrO_4^{2-}$, and $TeO_4^{2-}$.

16. The method of claim 12, wherein the non-metal ion in the non-metal oxyanion is selected from the group consisting of halogen, carbon, sulfur, nitrogen, and phosphorus.

17. The method of claim 12, wherein the non-metal oxyanion with the non-metal ion in the lower oxidation state is selected from the group consisting of $NO_2^-$, $PO_3^{3-}$, $SO_3^{2-}$, $ClO^-$, $ClO_2^-$, $ClO_3^-$, $BrO^-$, $BrO_2^-$, $BrO_3^-$, $IO^-$, $IO_2^-$, and $IO_3^-$ and/or the non-metal oxyanion with the non-metal ion in the higher oxidation state is selected from the group consisting of $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, and $IO_4^-$.

18. The method of claim 12, further comprising maintaining a steady-state pH differential of between about 1-6 between the anode electrolyte and the cathode electrolyte.

19. The method of claim 12, further comprising subjecting the anode electrolyte comprising metal oxyanion with metal ion in the higher oxidation state or the anode electrolyte comprising non-metal oxyanion with non-metal ion in the higher oxidation state to a thermal reaction to form oxygen gas and the metal oxyanion with the metal ion in the lower oxidation state or the non-metal oxyanion with the non-metal ion in the lower oxidation state, respectively.

20. The method of claim 12, further comprising:
transferring at least a portion of the anode electrolyte comprising the metal oxyanion with the metal ion in the higher oxidation state or the non-metal oxyanion with the non-metal ion in the higher oxidation state outside the electrochemical cell to a second cathode electrolyte of a second electrochemical cell; and
reducing the metal oxyanion with the metal ion in the higher oxidation state to the lower oxidation state or reducing the non-metal oxyanion with the non-metal ion in the higher oxidation state to the lower oxidation state at a second cathode of the second electrochemical cell.

21. A method to generate hydrogen gas, comprising:
providing an anode and an anode electrolyte in an electrochemical cell wherein the anode electrolyte comprises a metal oxyanion with a metal ion in a lower oxidation state or a non-metal oxyanion with a non-metal ion in a lower oxidation state;
oxidizing the metal oxyanion with the metal ion in the lower oxidation state to a metal oxyanion with metal ion in a higher oxidation state or oxidizing the non-metal oxyanion with the non-metal ion in the lower oxidation state to a non-metal oxyanion with non-metal ion in a higher oxidation state at the anode;
providing a cathode and a cathode electrolyte in the electrochemical cell and forming hydrogen gas and hydroxide ions at the cathode; and
subjecting the anode electrolyte comprising metal oxyanion with metal ion in the higher oxidation state or the anode electrolyte comprising non-metal oxyanion with non-metal ion in the higher oxidation state to a thermal reaction to form oxygen gas and the metal oxyanion with the metal ion in the lower oxidation state or the non-metal oxyanion with the non-metal ion in the lower oxidation state, respectively,
wherein the thermal reaction is carried out in presence of the hydroxide ions wherein a pH is more than 10 and/or wherein a catalyst is present.

22. The method of claim 21, wherein the metal ion in the metal oxyanion is selected from the group consisting of manganese, iron, chromium, selenium, copper, tin, silver, cobalt, uranium, lead, mercury, vanadium, bismuth, titanium, ruthenium, osmium, europium, zinc, cadmium, gold, nickel, palladium, platinum, rhodium, iridium, technetium, rhenium, molybdenum, tungsten, niobium, tantalum, zirconium, hafnium, and combination thereof.

23. The method of claim 21, wherein the metal oxyanion with the metal ion in the lower oxidation state is selected from the group consisting of $MnO_4^{2-}$, $FeO_4^{2-}$, $RuO_4^{2-}$, $OsO_4^{2-}$, $HSnO_2^-$, $SeO_3^{2-}$, $Cu_2O$, $CrO_3^{3-}$, and $TeO_3^{2-}$.

24. The method of claim 21, wherein the metal oxyanion with the metal ion in the higher oxidation state is selected from the group consisting of $MnO_4^-$, $HFeO_2^-$, $RuO_4^-$, $OsO_5^{2-}$, $SnO_3^{2-}$, $SeO_4^{2-}$, $CuO_2^{2-}$, $CrO_4^{2-}$, and $TeO_4^{2-}$.

25. The method of claim 21, wherein the non-metal ion in the non-metal oxyanion is selected from the group consisting of halogen, carbon, sulfur, nitrogen, and phosphorus.

26. The method of claim 21, wherein the non-metal oxyanion with the non-metal ion in the lower oxidation state is selected from the group consisting of $NO_2^-$, $PO_3^{3-}$, $SO_3^{2-}$, $ClO^-$, $ClO_2^-$, $ClO_3^-$, $BrO^-$, $BrO_2^-$, $BrO_3^-$, $IO^-$, $IO_2^-$, and $IO_3^-$ and/or the non-metal oxyanion with the non-metal ion in the higher oxidation state is selected from the group consisting of $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, and $IO_4^-$.

27. The method of claim 21, further comprising maintaining a steady-state pH differential of between about 1-6 between the anode electrolyte and the cathode electrolyte.

28. The method of claim 21, wherein no oxygen gas is formed at the anode or less than 25% of the Faradaic efficiency is for the oxygen evolution reaction at the anode.

29. The method of claim 21, further comprising subjecting the anode electrolyte comprising metal oxyanion with metal ion in the higher oxidation state or the anode electrolyte comprising non-metal oxyanion with non-metal ion in the higher oxidation state to a thermal reaction to form oxygen gas and the metal oxyanion with the metal ion in the lower oxidation state or the non-metal oxyanion with the non-metal ion in the lower oxidation state, respectively.

30. The method of claim 21, further comprising:
transferring at least a portion of the anode electrolyte comprising the metal oxyanion with the metal ion in the higher oxidation state or the non-metal oxyanion with the non-metal ion in the higher oxidation state outside the electrochemical cell to a second cathode electrolyte of a second electrochemical cell; and
reducing the metal oxyanion with the metal ion in the higher oxidation state to the lower oxidation state or reducing the non-metal oxyanion with the non-metal ion in the higher oxidation state to the lower oxidation state at a second cathode of the second electrochemical cell.

* * * * *